US011141965B2

(12) United States Patent
Ophardt et al.

(10) Patent No.: US 11,141,965 B2
(45) Date of Patent: Oct. 12, 2021

(54) CO-EXTRUDED MULTI-LAYER TUBE FOR USE IN FORMING FLEXIBLE BAGS

(71) Applicant: OP-Hygiene IP GmbH, Niederbipp (CH)

(72) Inventors: Heiner Ophardt, Arisdorf (CH); Ali Mirbach, Issum (DE); Patrick Geurts, BK Roermond (NL)

(73) Assignee: OP-Hygiene IP GmbH, Niederbipp (CH)

( * ) Notice: Subject to any disclaimer, the term of this patent is extended or adjusted under 35 U.S.C. 154(b) by 89 days.

(21) Appl. No.: 16/422,017

(22) Filed: May 24, 2019

(65) Prior Publication Data

US 2019/0358939 A1 Nov. 28, 2019

Related U.S. Application Data

(60) Provisional application No. 62/676,631, filed on May 25, 2018.

(51) Int. Cl.
*B32B 27/32* (2006.01)
*B32B 1/02* (2006.01)
(Continued)

(52) U.S. Cl.
CPC .............. *B32B 27/325* (2013.01); *B32B 1/08* (2013.01); *B32B 27/08* (2013.01); *B65B 1/04* (2013.01); *B29C 48/08* (2019.02); *B29C 48/21* (2019.02); *B29K 2995/0012* (2013.01); *B29K 2995/0069* (2013.01); *B29K 2995/0081* (2013.01); *B29L 2031/712* (2013.01); *B32B 1/02* (2013.01); *B32B 27/306* (2013.01); *B32B 27/32* (2013.01); *B32B 27/327* (2013.01); *B32B 27/34* (2013.01); *B32B 27/36* (2013.01); *B32B 2307/31* (2013.01); *B32B 2307/5825* (2013.01);
(Continued)

(58) Field of Classification Search
CPC .. B32B 1/02; B32B 1/08; B32B 27/08; B32B 27/306; B32B 27/32; B32B 27/325; B32B 27/327; B32B 27/34; B32B 27/36; B32B 2307/31; B32B 2307/5825; B32B 2307/7265; Y10T 428/1324; Y10T 428/1341; Y10T 428/1383; Y10T 428/1393; Y10T 428/31743; Y10T 428/3175; Y10T 428/31797; B29C 48/21; B29K 2995/0012; B29K 2995/0069; B29K 2995/0081; B29L 2031/712
See application file for complete search history.

(56) References Cited

U.S. PATENT DOCUMENTS 3,508,944 A 4/1970 Henderson et al.
3,821,162 A 6/1974 Baird, Jr.
(Continued)

FOREIGN PATENT DOCUMENTS

| EP | 1 391 294 | 2/2004 |
|----|-----------|--------|
| EP | 2644280 | 12/2017 |
| JP | 2012 111538 | 6/2012 |

*Primary Examiner* — Walter Aughenbaugh
(74) *Attorney, Agent, or Firm* — Thorpe North & Western, LLP

(57) ABSTRACT

A multilayer film including a barrier layer, a sealing layer, and an alcohol barrier layer. The alcohol barrier layer includes cyclic olefin copolymer and is positioned between the barrier layer and the sealing layer. The multilayer film can be used to form a pouch for containing an alcohol-based hand sanitizer.

20 Claims, 19 Drawing Sheets

(51) Int. Cl.
  *B32B 1/08*   (2006.01)
  *B32B 27/08*  (2006.01)
  *B65B 1/04*   (2006.01)
  *B29C 48/08*      (2019.01)
  *B29C 48/21*      (2019.01)
  *B29L 31/00*      (2006.01)
  *B32B 27/30*      (2006.01)
  *B32B 27/34*      (2006.01)
  *B32B 27/36*      (2006.01)

(52) U.S. Cl.
  CPC ... *B32B 2307/7265* (2013.01); *B32B 2553/00* (2013.01); *Y10T 428/1324* (2015.01); *Y10T 428/1341* (2015.01); *Y10T 428/1383* (2015.01); *Y10T 428/1393* (2015.01); *Y10T 428/3175* (2015.04); *Y10T 428/31743* (2015.04); *Y10T 428/31797* (2015.04)

(56) References Cited

U.S. PATENT DOCUMENTS

| | | | |
|---|---|---|---|
| 4,617,241 A | | 10/1986 | Mueller |
| 5,373,970 A | | 12/1994 | Ophardt |
| 5,836,482 A | | 11/1998 | Ophardt et al. |
| 6,042,906 A | | 3/2000 | Itoh et al. |
| 6,094,889 A | * | 8/2000 | Van Loon ............ B32B 27/32 53/450 |
| 7,748,573 B2 | | 7/2010 | Ophardt et al. |
| 7,765,918 B2 | | 8/2010 | Ophardt et al. |
| 7,798,369 B2 | | 9/2010 | Ophardt |
| 7,984,825 B2 | | 7/2011 | Ophardt et al. |
| 8,074,844 B2 | | 12/2011 | Ophardt et al. |
| 8,113,388 B2 | | 2/2012 | Ophardt et al. |
| 8,365,954 B2 | | 2/2013 | Ophardt et al. |
| 8,684,236 B2 | | 4/2014 | Ophardt |
| 8,816,860 B2 | | 8/2014 | Ophardt et al. |
| 8,976,031 B2 | | 3/2015 | Ophardt |
| 9,062,667 B2 | | 6/2015 | Ophardt et al. |
| 9,175,674 B2 | | 11/2015 | Ophardt et al. |
| 9,437,103 B2 | | 9/2016 | Ophardt |
| 2006/0057410 A1 | | 3/2006 | Saavedra et al. |
| 2006/0251876 A1 | | 11/2006 | Goerlitz et al. |
| 2008/0112830 A1 | | 5/2008 | Ophardt et al. |
| 2008/0121664 A1 | | 5/2008 | Ophardt et al. |
| 2009/0208685 A1 | | 8/2009 | Rivers et al. |
| 2011/0027428 A1 | | 2/2011 | Bekele |
| 2012/0276217 A1 | * | 11/2012 | Steve ............ A01N 43/16 424/600 |
| 2014/0370278 A1 | | 12/2014 | Hausmann et al. |
| 2015/0190827 A1 | | 7/2015 | Ophardt et al. |
| 2015/0328865 A1 | * | 11/2015 | Hernandez ............ B32B 27/28 428/35.7 |
| 2016/0097386 A1 | | 4/2016 | Ophardt et al. |
| 2016/0256015 A1 | | 9/2016 | Ophardt et al. |
| 2017/0105584 A1 | | 4/2017 | Ophardt et al. |
| 2019/0135534 A1 | | 5/2019 | Ophardt |

* cited by examiner

CO-EXTRUDED MULTI-LAYER TUBE FOR USE IN FORMING FLEXIBLE BAGS

FIELD OF THE INVENTION

This invention relates to multilayer films, and more particularly to blow extruded multilayer films that form flexible bags for storing concentrated alcohol-based hand cleaning fluids.

BACKGROUND OF THE INVENTION

Alcohol-based hand sanitizers are known to be effective at killing microorganisms, and thus reduce the risk of transmitting infectious agents. High concentrations of alcohol are generally most effective, with a range of 70% to 95% alcohol being preferred. Alcohol-based hand sanitizers are often used in health care settings to reduce the risk of disease transmission by health care staff.

In order to ensure adequate hand cleaning by health care staff, hand sanitizer must be available before and after every interaction with patients. This is often achieved by installing hand sanitizer dispensers throughout the healthcare facility at convenient locations, such as beside patient beds, at nursing stations, and at entrances and exits. Each dispenser typically includes its own reservoir containing a supply of the hand sanitizer, which must be replaced or refilled periodically.

As concentrated alcohol is prone to evaporation, the hand sanitizer stored in these dispensers is at risk of losing alcohol by evaporation, thus becoming less effective over time. To avoid this loss of alcohol, hand sanitizer reservoirs are typically constructed from thick, rigid plastic. The reservoirs are thus bulky in size, resulting in higher material costs, as well as higher transportation and storage costs.

SUMMARY OF THE INVENTION

To at least partially overcome some of the disadvantages of previously known methods and products, the invention provides a multilayer film with an alcohol barrier layer that is positioned between a barrier layer and a sealing layer, the alcohol barrier layer including a cyclic olefin copolymer. The inventors have appreciated that the multilayer film can advantageously be used to produce a thin, flexible pouch for storing concentrated alcohol-based solutions, with minimal loss of alcohol by evaporation. The invention is thus able to reduce the material, transportation, and storage costs of hand sanitizer reservoirs, among other advantages. For example, a thin, flexible pouch can be more easily made airless compared to a rigid container, since a flexible pouch can collapse as the alcohol-based solution is dispensed therefrom. A flammable mixture of oxygen and alcohol vapor within the pouch can thereby be avoided, particularly when the alcohol contained within the pouch is highly concentrated.

The inventors have appreciated that the multilayer film can be produced in a cost effective manner by blown film extrusion. The inventors have found that a thin, blow extruded layer of cyclic olefin copolymer provides an effective barrier against alcohol evaporation. In some embodiments, the alcohol barrier layer is only about 10 to 20 microns thick. Using a thin layer of cyclic olefin copolymer reduces the stiffness of the film and reduces costs. The sealing layer is optionally a layer of polyethylene, or a similar copolymer or polymer blend. The sealing layer can be melted by a heat sealing device to form sealed edges, such as the top and bottom edges of a bag or pouch for containing alcohol-based hand sanitizer. The barrier layer is optionally a thin layer of polyamide, or a similar polymer or polymer blend. The barrier layer preferably has a higher melting point than the sealing layer, and acts as a thermal barrier layer that prevents the film from adhering to the heat sealing device. The barrier layer is also preferably puncture resistant.

One or more additional layers may also be incorporated into the film to provide additional functionality. For example, a tie layer may be included between the barrier layer and the alcohol barrier layer, to better adhere the two layers together. An additional alcohol barrier layer, such as ethylene vinyl alcohol, may also be included.

Accordingly, in one aspect the present invention resides in a multilayer film comprising: a thermal barrier layer; a sealing layer; and an alcohol barrier layer; wherein the alcohol barrier layer is positioned between the thermal barrier layer and the sealing layer; and wherein the alcohol barrier layer comprises a cyclic olefin copolymer.

Preferably, the barrier layer has a higher melting temperature than the sealing layer. The barrier lay may, for example, have a melting point above 150 degrees Celsius. The barrier layer is also preferably puncture resistant. The barrier layer may comprise, for example, polyamide, polyester, polypropylene, or blends thereof.

In some embodiments, the multilayer film is configured to be heat sealed by a sealing device; and the barrier layer prevents the multilayer film from adhering to the sealing device. Optionally, the barrier layer has a thickness of 5 to 10 microns, or 10 to 20 microns.

The sealing layer preferably melts to form a seal when heated by a sealing device. The sealing layer may comprise, for example, polyethylene, a copolymer of ethylene, polypropylene, a copolymer of propylene, a polyolefine elastomer, a polyolefine plastomer, or blends thereof. The copolymer of ethylene may comprise, for example, ethylene-vinyl acetate.

Optionally, the sealing layer has a thickness of 1 to 200 microns, or 20 to 100 microns.

Preferably, the alcohol barrier layer substantially prevents alcohol from passing through the multilayer film. The alcohol may comprise, for example, ethanol or isopropanol.

In some embodiments, the alcohol barrier layer is 100% cyclic olefin copolymer. In other embodiments, the alcohol barrier layer is a cyclic olefin copolymer blend.

Optionally, the alcohol barrier layer has a thickness of 1 to 100 microns, or 2 to 20 microns.

The multilayer film may further comprise a tie layer that is positioned between the thermal barrier layer and the alcohol barrier layer. Preferably, the tie layer adheres the thermal barrier layer to the alcohol barrier layer. The tie layer may comprise, for example, maleic anhydride grafted polyethylene, a copolymer of ethylene, or blends thereof.

Optionally, the tie layer has a thickness of 1 to 100 microns, or 2 to 20 microns.

The multilayer film may be formed as a tube, with the thermal barrier layer forming an outer layer of the tube and the sealing layer forming an inner layer of the tube. The tube may comprise a first portion and a second portion, wherein the tube is collapsible to a collapsed state in which the sealing layer of the multilayer film in the first portion of the tube contacts the sealing layer of the multilayer film in the second portion of the tube. Optionally, the tube is heat sealable when in the collapsed state by heating the first portion of the tube and the second portion of the tube so that the sealing layer of the first portion of the tube melts to form a seal with the sealing layer of the second portion of the tube.

The multilayer film may be produced by a coextrusion process, preferably blown film extrusion.

The multilayer film optionally forms a pouch for containing alcohol. The pouch may, for example, contain up to 80% ethanol or isopropanol. In some embodiments, the alcohol is at a concentration of 70% to 100%, 80% to 90%, about 85%, or about 70%.

The pouch may be configured to contain the alcohol for 4 weeks at 40 degrees Celsius at 70% relative humidity without delamination, blistering, and/or discoloration. In some embodiments, the pouch is configured so that less than 5% by weight of the alcohol is lost by evaporation through the multilayer film after 3 years at 40 degrees Celsius at 70% relative humidity. The pouch may also be configured so that less than 2% by weight of the alcohol is lost by evaporation through the multilayer film after 3 years at 20 degrees Celsius and at a relative humidity in the range of 50-60%.

The pouch may, for example, contain an alcohol-based hand cleaning fluid. Optionally, the alcohol-based hand cleaning fluid comprises about 70% ethanol.

In some embodiments, the barrier layer forms an outer layer of the pouch and the sealing layer forms an inner layer of the pouch; and the pouch is sealed by heating the multilayer film so that the sealing layer of a first portion of the pouch melts to form a seal with the sealing layer of a second portion of the pouch. Preferably, the barrier layer does not melt when the pouch is sealed.

The multilayer film is preferably transparent.

In some embodiments, the barrier layer comprises polyamide or copolyamide. The barrier layer may have a thickness of about 10 microns.

The tie layer may comprise maleic anhydride grafted linear low-density polyethylene or blends thereof. Optionally, the tie layer has a thickness of about 10 microns.

The sealing layer may comprise linear low-density polyethylene.

Preferably, the film is flexible.

The barrier layer is preferably polyamide.

The sealing layer is preferably polyethylene.

The multilayer film preferably has a thickness of 110 to 160 microns.

In some embodiments, the alcohol barrier layer is a first alcohol barrier layer, and the multilayer film further comprises a second alcohol barrier layer. In some embodiments, the first alcohol barrier layer substantially prevents liquid alcohol from passing through the multilayer film, and the second alcohol barrier layer substantially prevents gaseous alcohol from passing through the multilayer film.

The second alcohol barrier layer may be positioned between the thermal barrier layer and the first alcohol barrier layer. The second alcohol barrier layer also may be positioned between the thermal barrier layer and the tie layer. The second alcohol barrier layer preferably comprises ethylene vinyl alcohol.

In some embodiments, the second alcohol barrier layer is ethylene vinyl alcohol.

Optionally, the second alcohol barrier layer has a thickness of about 5 microns.

In another aspect, the present invention resides in a multilayer film comprising, in order: a polyamide layer having a thickness of about 10 to 20 microns; a tie layer having a thickness of about 5 to 15 microns; a cyclic olefin copolymer layer having a thickness of about 10 to 20 microns; and a polyethylene layer having a thickness of about 80 to 130 microns.

In a further aspect, the present invention resides in a multilayer film consisting of, in order: a polyamide layer having a thickness of about 10 to 20 microns; a tie layer having a thickness of about 5 to 15 microns; a cyclic olefin copolymer layer having a thickness of about 10 to 20 microns; and a polyethylene layer having a thickness of about 80 to 130 microns.

In a still further aspect, the present invention resides in a multilayer film comprising, in order: a polyamide layer having a thickness of about 10 microns; an ethylene vinyl alcohol layer having a thickness of about 5 microns; a tie layer having a thickness of about 20 microns; a cyclic olefin copolymer layer having a thickness of about 20 microns; and a polyethylene layer having a thickness of about 80 microns.

In another aspect, the present invention resides in a multilayer film consisting of, in order: a polyamide layer having a thickness of about 10 microns; an ethylene vinyl alcohol layer having a thickness of about 5 microns; a tie layer having a thickness of about 20 microns; a cyclic olefin copolymer layer having a thickness of about 20 microns; and a polyethylene layer having a thickness of about 80 microns.

In another aspect, the present invention resides in a pouch for containing alcohol, comprising: a pouch body formed from the aforementioned multilayer film.

The alcohol may, for example, have a concentration of 70% to 95%.

The pouch is optionally for hygiene, pharmaceutical, or medical applications.

The pouch preferably contains an alcohol-based hand cleaning fluid.

In some embodiments, the pouch is a fluid reservoir for a fluid dispenser.

Optionally, the pouch body defines an internal chamber that contains the alcohol, and the pouch body is configured to prevent air from entering the internal chamber.

The internal chamber may be configured to be airless.

The pouch body is preferably collapsible.

The pouch may further comprise a spout for delivering the alcohol from the pouch.

The spout optionally comprises a polyethylene spout body in fluid communication with the internal chamber.

The spout may be configured to permit the alcohol to be drawn from the pouch through the spout and to prevent air from entering the pouch through the spout.

The multilayer film is preferably arranged so that the barrier layer forms an outer layer of the pouch body and the sealing layer forms an inner layer of the pouch body.

In some embodiments, the pouch has a heat sealed edge, wherein the sealing layer of a first portion of the pouch body is heat sealed to the sealing layer of a second portion of the pouch body.

The spout may have an outlet portion and a sealing portion, the sealing portion being heat sealed between the first portion of the pouch body and the second portion of the pouch body within the heat sealed edge; and wherein the sealing portion is in fluid communication with the internal chamber and is in fluid communication with the outlet portion.

The pouch may have a closed configuration and an open configuration; and wherein the pouch is configured to substantially prevent the alcohol from escaping from the pouch when in the closed configuration.

In some embodiments, the pouch is configured so that less than 5% by weight of the alcohol is lost from the pouch by evaporation after 3 years at 40 degrees Celsius and at 70% relative humidity.

In another aspect, the present invention resides in a method of producing a pouch for containing alcohol, comprising:
  extruding a tube of the aforementioned multilayer film by blown film extrusion;
  cutting the tube transversely at spaced intervals; and
  heat sealing the tube transversely to form the pouch.

The method may further comprise inserting a spout into the pouch; heat sealing the spout to the pouch; and/or filling the pouch with the alcohol.

The alcohol may, for example, have a concentration of 70% to 95%.

The method optionally produces the aforementioned pouch.

In another aspect, the present invention resides in a method of storing ethanol at a concentration of 70% to 95%, comprising:
  extruding a tube of the aforementioned multilayer film by blown film extrusion;
  cutting the tube transversely at spaced intervals;
  heat sealing the tube transversely to form a pouch; and
  filling the pouch with the ethanol.

In another aspect, the present invention resides in a method of storing ethanol at a concentration of 70% to 95%, comprising:
  extruding a tube of the aforementioned multilayer film by blown film extrusion;
  cutting the tube transversely at spaced intervals;
  heat sealing the tube transversely to form the aforementioned pouch; and
  filling the pouch with the ethanol.

In another aspect, the present invention resides in a method of storing alcohol, comprising: placing the alcohol in the aforementioned pouch.

In further aspect, the present invention resides in a method of storing an alcohol-based hand sanitizer, comprising:
  placing the hand sanitizer in a pouch formed from a multilayer film, the multilayer film comprising an alcohol barrier layer that contains a cyclic olefin copolymer.

Optionally, the multilayer film is produced by blown film extrusion; wherein the multilayer film further comprises a barrier layer and a sealing layer; wherein the alcohol barrier layer is positioned between the barrier layer and the sealing layer; wherein the alcohol barrier layer has a thickness of 5 to 20 microns; and wherein the multilayer film has a thickness of 110 to 160 microns.

The alcohol barrier layer preferably substantially prevents alcohol from passing through the multilayer film. Optionally, the barrier layer comprises polyamide and has a thickness of about 10 to 20 microns; and the sealing layer comprises polyethylene and has a thickness of about 80 microns.

The method may further comprise: placing the pouch in a hand sanitizer dispenser that is configured to dispense the hand sanitizer from the pouch.

In another aspect, the present invention resides in a multilayer film comprising:
  a barrier layer;
  a sealing layer; and
  an alcohol barrier layer;
  wherein the alcohol barrier layer is positioned between the barrier layer and the sealing layer; and
  wherein the alcohol barrier layer comprises a cyclic olefin copolymer.

In some embodiments, the barrier layer has a higher melting temperature than the sealing layer;
  wherein the barrier layer comprises polyamide, copolyamide, polyester, polypropylene, or blends thereof; and
  wherein the barrier layer has a thickness of 1 to 100 microns, preferably 5 to 20 microns, more preferably 10 to 20 microns, even more preferably about 10 microns.

In some embodiments, the sealing layer comprises polyethylene, a copolymer of ethylene, ethylene-vinyl acetate, linear low-density polyethylene, or blends thereof; and
  wherein the sealing layer has a thickness of 1 to 200 microns, preferably 60 to 100 microns, more preferably about 80 microns.

Preferably, the alcohol barrier layer substantially prevents alcohol from passing through the multilayer film. The alcohol optionally comprises ethanol or isopropanol.

In some embodiments, the alcohol barrier layer is 100% cyclic olefin copolymer. In some embodiments, the alcohol barrier layer is a cyclic olefin copolymer blend.

The alcohol barrier layer may, for example, have a thickness of 1 to 100 microns, preferably 10 to 20 microns, more preferably about 20 microns.

The multilayer film may further comprise a tie layer that is positioned between the barrier layer and the alcohol barrier layer;
  wherein the tie layer comprises maleic anhydride grafted polyethylene, a copolymer of ethylene, maleic anhydride grafted linear low-density polyethylene, or blends thereof; and
  wherein the tie layer has a thickness of 1 to 100 microns, preferably about 20 microns.

Optionally, the multilayer film is formed as a tube, with the barrier layer forming an outer layer of the tube and the sealing layer forming an inner layer of the tube.

The multilayer film is sometimes produced by a coextrusion process, preferably blown film extrusion.

The multilayer film may form a pouch for containing alcohol.

The pouch may be a fluid reservoir for a fluid dispenser and contain an alcohol-based hand cleaning fluid, the hand cleaning fluid preferably comprising 70% to 100% alcohol.

Optionally, the barrier layer forms an outer layer of the pouch and the sealing layer forms an inner layer of the pouch; and
  wherein the pouch is sealed by heating the multilayer film so that the sealing layer of a first portion of the pouch melts to form a seal with the sealing layer of a second portion of the pouch, without melting the barrier layer.

Preferably, the multilayer film is transparent, flexible, and has a thickness of 110 to 160 microns.

In some embodiments, the alcohol barrier layer is a first alcohol barrier layer, the multilayer film further comprising a second alcohol barrier layer;
  wherein the second alcohol barrier layer is positioned between the thermal barrier layer and the first alcohol barrier layer, or between the thermal barrier layer and the tie layer;
  wherein the second alcohol barrier layer comprises ethylene vinyl alcohol; and
  wherein the second alcohol barrier layer has a thickness of about 5 microns.

In another aspect, the present invention resides in a multilayer film comprising:
  a barrier layer;
  a sealing layer; and
  an alcohol barrier layer;
  wherein the alcohol barrier layer is positioned between the barrier layer and the sealing layer; and
  wherein the alcohol barrier layer comprises a cyclic olefin copolymer.

Optionally, the barrier layer has a higher melting temperature than the sealing layer;

wherein the barrier layer comprises polyamide, copolyamide, polyester, polypropylene, or blends thereof; and wherein the barrier layer has a thickness of 1 to 100 microns.

Optionally, the sealing layer comprises polyethylene, a copolymer of ethylene, ethylene-vinyl acetate, linear low-density polyethylene, or blends thereof; and wherein the sealing layer has a thickness of 1 to 200 microns.

Preferably, the alcohol barrier layer substantially prevents alcohol from passing through the multilayer film.

In some embodiments, the alcohol barrier layer is 100% cyclic olefin copolymer. In some embodiments, the alcohol barrier layer is a cyclic olefin copolymer blend.

The alcohol barrier layer may have a thickness of 1 to 100 microns.

The multilayer film may further comprise a tie layer that is positioned between the barrier layer and the alcohol barrier layer;

wherein the tie layer comprises maleic anhydride grafted polyethylene, a copolymer of ethylene, maleic anhydride grafted linear low-density polyethylene, or blends thereof; and wherein the tie layer has a thickness of 1 to 100 microns.

The multilayer film is optionally formed as a tube, with the barrier layer forming an outer layer of the tube and the sealing layer forming an inner layer of the tube.

The multilayer film is preferably produced by blown film extrusion.

The multilayer film may form a pouch for containing alcohol.

In some embodiments, the pouch is a fluid reservoir for a fluid dispenser and contains an alcohol-based hand cleaning fluid, the hand cleaning fluid comprising 70% to 100% alcohol.

Optionally, the barrier layer forms an outer layer of the pouch and the sealing layer forms an inner layer of the pouch; and wherein the pouch is sealed by heating the multilayer film so that the sealing layer of a first portion of the pouch melts to form a seal with the sealing layer of a second portion of the pouch, without melting the barrier layer.

The multilayer film is preferably transparent, flexible, and has a thickness of 110 to 160 microns.

In some embodiments, the alcohol barrier layer is a first alcohol barrier layer, the multilayer film further comprising a second alcohol barrier layer;

wherein the second alcohol barrier layer is positioned between the barrier layer and the first alcohol barrier layer;

wherein the second alcohol barrier layer comprises ethylene vinyl alcohol; and wherein the second alcohol barrier layer has a thickness of about 5 microns.

In another aspect, the present invention resides in a multilayer film comprising, in order:

a polyamide layer having a thickness of about 10 to 20 microns;

a tie layer having a thickness of about 5 to 15 microns;

a cyclic olefin copolymer layer having a thickness of about 10 to 20 microns; and a polyethylene layer having a thickness of about 80 to 130 microns.

In a further aspect, the present invention resides in a method of storing an alcohol-based hand sanitizer, comprising:

placing the hand sanitizer in a pouch formed from a multilayer film, the multilayer film comprising an alcohol barrier layer that contains a cyclic olefin copolymer.

In some embodiments, the multilayer film is produced by blown film extrusion;

wherein the multilayer film further comprises a barrier layer and a sealing layer;

wherein the alcohol barrier layer is positioned between the barrier layer and the sealing layer;

wherein the alcohol barrier layer has a thickness of 5 to 20 microns; and wherein the multilayer film has a thickness of 110 to 160 microns.

Preferably, the alcohol barrier layer substantially prevents alcohol from passing through the multilayer film. In some embodiments, the barrier layer comprises polyamide and has a thickness of about 10 to 20 microns; and the sealing layer comprises polyethylene and has a thickness of about 110 to 160 microns.

The method may further comprise placing the pouch in a hand sanitizer dispenser that is configured to dispense the hand sanitizer from the pouch.

In another aspect, the present invention resides in a fluid dispenser comprising:

a flexible pouch with an internal chamber that contains the fluid to be dispensed;

a fluid inlet positioned within the internal chamber;

a fluid outlet in fluid communication with the fluid inlet;

a dispensing mechanism operable to draw an allotment of the fluid from the internal chamber into the fluid inlet, and to dispense the allotment of fluid from the fluid outlet; and an elongated filament that extends from the fluid inlet into the internal chamber.

Preferably, the flexible pouch is configured to collapse as the fluid is dispensed from the internal chamber, and the elongated filament is configured to maintain an open pathway for the fluid to be drawn into the fluid inlet as the pouch collapses.

Optionally, the elongated filament has ridged edges and is formed from plastic.

In some embodiments, the fluid inlet is spaced from a bottom edge of the pouch, and the elongated filament extends towards the bottom edge.

Optionally, the elongated filament has a first end that is positioned in or adjacent to the fluid inlet, and a second end that is positioned adjacent to the bottom edge of the pouch.

The pouch is optionally formed from the aforementioned multilayer film, and is optionally the aforementioned pouch.

In some embodiments, the alcohol barrier layer is selected to provide adhesion between the barrier layer and the sealing layer.

The alcohol barrier layer optionally comprises a blend of cyclic olefin copolymer and a tie material selected from the group consisting of: maleic anhydride grafted polyolefin, polyethylene, polypropylene, their copolymers, and blends thereof.

The alcohol barrier layer may comprise a blend of cyclic olefin copolymer and maleic anhydride grafted polyolefin. In some embodiments, the blend has a ratio of cyclic olefin copolymer:maleic anhydride grafted polyolefin of about 80:20 or of about 70:30.

In some embodiments, the barrier layer comprises nylon 6 or polyethylene terephthalate.

In some embodiments, the barrier layer has a melting temperature that is about 20 to 150 degrees Celsius above a melting temperature of the sealing layer.

Preferably, the barrier layer comprises a blend of high density polyethylene and low density polyethylene, or a blend of high density polyethylene, cyclic olefin copolymer, and low density polyethylene.

Optionally, the multilayer film further comprises a tear resistance layer that is positioned between the barrier layer and the alcohol barrier layer. The tear resistance layer preferably comprises polyethylene or blends thereof, and may, for example, comprise low density polyethylene.

Preferably, the sealing layer comprises low density polyethylene.

In another aspect, the present invention resides in a multilayer film comprising, in order: a barrier layer; a tie layer; a cyclic olefin copolymer layer; and a low density polyethylene layer; wherein the barrier layer comprises nylon 6 or polyethylene terephthalate.

In a further aspect, the present invention resides in a multilayer film consisting of, in order: a barrier layer; a tie layer; a cyclic olefin copolymer layer; and a low density polyethylene layer; wherein the barrier layer comprises nylon 6 or polyethylene terephthalate.

In a further aspect, the present invention resides in a multilayer film comprising, in order: a barrier layer; a tie layer; a first low density polyethylene layer; a cyclic olefin copolymer layer; and a second low density polyethylene layer; wherein the barrier layer comprises nylon 6 or polyethylene terephthalate.

In a further aspect, the present invention resides in a multilayer film consisting of, in order: a barrier layer; a tie layer; a first low density polyethylene layer; a cyclic olefin copolymer layer; and a second low density polyethylene layer; wherein the barrier layer comprises nylon 6 or polyethylene terephthalate.

In a further aspect, the present invention resides in a multilayer film comprising, in order: a barrier layer; a first low density polyethylene layer; a cyclic olefin copolymer layer; and a second low density polyethylene layer; wherein the barrier layer comprises a blend of high density polyethylene and low density polyethylene.

In a further aspect, the present invention resides in a multilayer film consisting of, in order: a barrier layer; a first low density polyethylene layer; a cyclic olefin copolymer layer; and a second low density polyethylene layer; wherein the barrier layer comprises a blend of high density polyethylene and low density polyethylene.

In a further aspect, the present invention resides in a multilayer film comprising, in order: a barrier layer; a first low density polyethylene layer; a cyclic olefin copolymer layer; and a second low density polyethylene layer; wherein the barrier layer comprises a blend of high density polyethylene, cyclic olefin copolymer, and low density polyethylene.

In a still further aspect, the present invention resides in a multilayer film consisting of, in order: a barrier layer; a first low density polyethylene layer; a cyclic olefin copolymer layer; and a second low density polyethylene layer; wherein the barrier layer comprises a blend of high density polyethylene, cyclic olefin copolymer, and low density polyethylene.

Optionally, the alcohol barrier layer is positioned directly between two polyethylene layers.

In some embodiments, the barrier layer is a first one of the two polyethylene layers; and the sealing layer is a second one of the two polyethylene layers.

Preferably, a melting temperature of the barrier layer is above 100 degrees Celsius.

The barrier layer optionally comprises polyethylene.

In some embodiments, the barrier layer comprises low density polyethylene, medium density polyethylene, high density polyethylene, a polyolefin plastomer, a polyolefin elastomer, or blends thereof.

Preferably, a melting temperature of the barrier layer is at least about 20 to 80 degrees Celsius above a melting temperature of the sealing layer.

The glass transition temperature of the barrier layer is preferably above 50 degrees Celsius.

The barrier layer optionally comprises cyclic olefin copolymer.

The sealing layer optionally comprises a copolymer of ethylene.

In some embodiments, the sealing layer comprises ethylene-vinyl acetate, ethylene-methyl acrylate, ethylene-ethyl acrylate, or ethylene butyl acrylate.

In a further aspect, the present invention resides in a multilayer film comprising: an alcohol barrier layer; and a sealing layer; wherein the alcohol barrier layer comprises a cyclic olefin copolymer.

Preferably, a melting temperature of the alcohol barrier layer is higher than a melting temperature of the sealing layer.

In some embodiments, the sealing layer comprises polyethylene.

In a further aspect, the present invention resides in a multilayer film comprising: a cyclic olefin copolymer layer; and a polyethylene layer.

In a still further aspect, the present invention resides in a multilayer film consisting of: a cyclic olefin copolymer layer; and a polyethylene layer.

In another aspect, the present invention resides in a multilayer film comprising, in order: a barrier layer; a first low density polyethylene layer; a cyclic olefin copolymer layer; and a second low density polyethylene layer; wherein the barrier layer comprises high density polyethylene, medium density polyethylene, low density polyethylene, or blends thereof.

In a further aspect, the present invention resides in a multilayer film consisting of, in order: a barrier layer; a first low density polyethylene layer; a cyclic olefin copolymer layer; and a second low density polyethylene layer; wherein the barrier layer comprises high density polyethylene, medium density polyethylene, low density polyethylene, or blends thereof.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
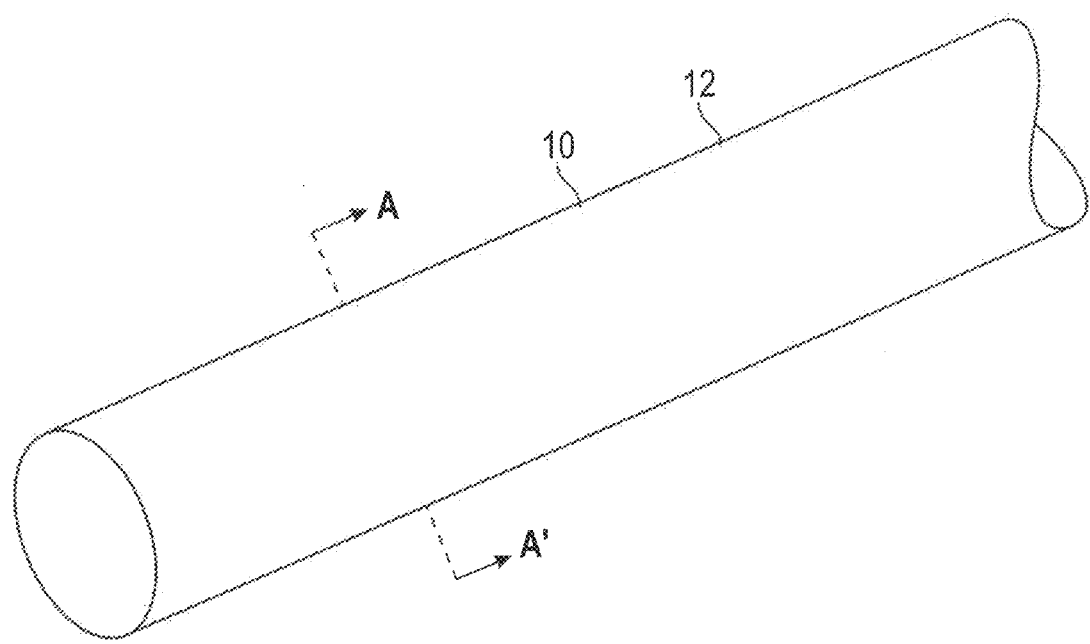
FIG. 1 is a perspective view of a blow extruded multilayer film tube in accordance with a first embodiment of the present invention.
Figure 2:
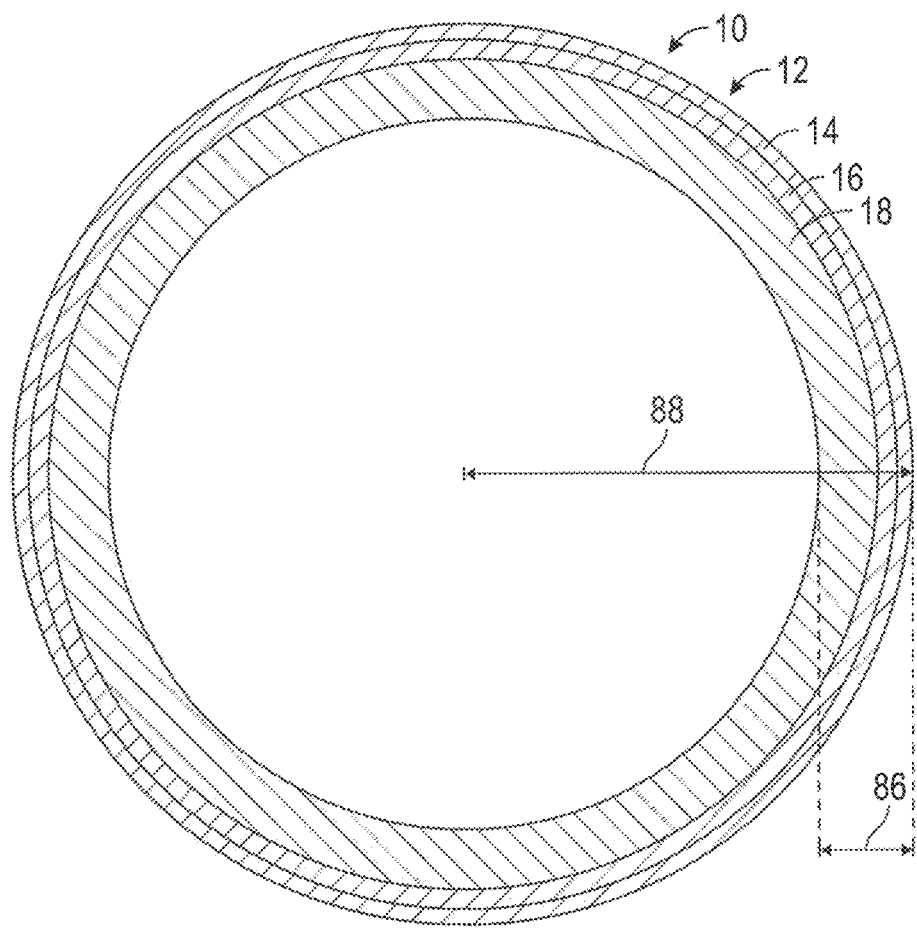
FIG. 2 is a cross-sectional view of the tube shown in FIG. 1 along section line A-A', shown not to scale to better illustrate the layers of the film.
Figure 3:
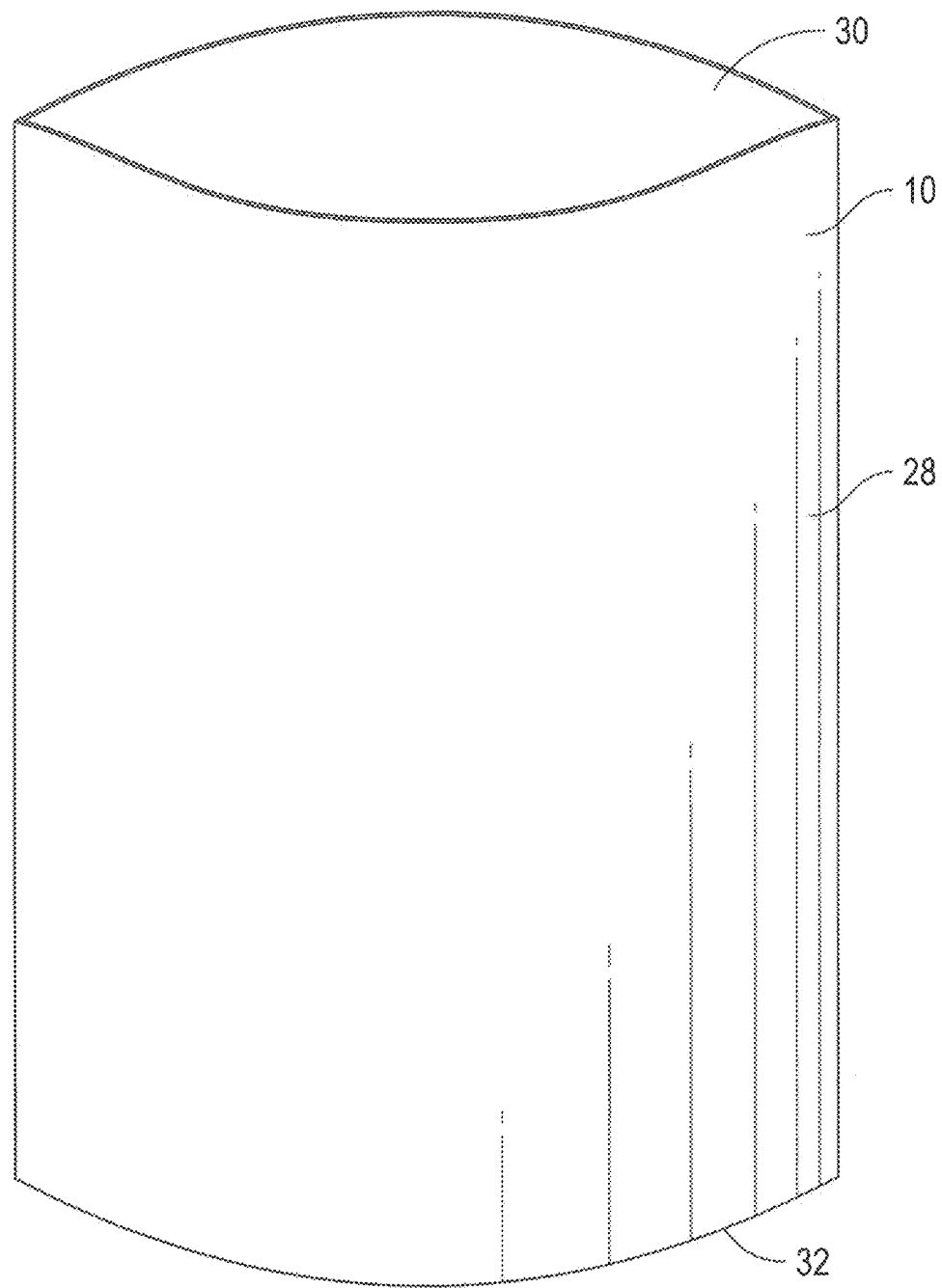
FIG. 3 is a perspective view of a cut section of the tube shown in FIG. 1.

FIGS. 1 and 2 show a multilayer film 10 in accordance with a first embodiment of the invention. The multilayer film 10 is in the form of a tube 12, which is produced by blown film coextrusion in accordance with known methods. Blown film coextrusion is described, for example, in U.S. Pat. No. 3,508,944 to Henderson et al., issued Apr. 28, 1970; U.S. Pat. No. 3,821,182 to Baird et al., issued Jun. 28, 1974; and U.S. Pat. No. 4,617,241 to Mueller, issued Oct. 14, 1986, each of which is incorporated herein by reference.

As shown in FIG. 2, the multilayer film 10 has an outer barrier layer 14, a middle alcohol barrier layer 16, and an inner sealing layer 18. To more clearly illustrate the layers 14, 16, 18 of the film 10, FIG. 2 is not drawn to scale. The thickness 86 of the film 10 is, in fact, much smaller relative to the radius 88 of the tube 12 than is shown in FIG. 2. The film 10 has a thickness 86 of about 110 to 120 microns, while the radius 88 of the tube 12 is typically in the range of 2 to 20 cm.

The barrier layer 14 is formed from polyamide, and has a thickness of about 10 to 20 microns. The alcohol barrier layer 16 is formed from cyclic olefin copolymer, and has a thickness of about 20 microns. The sealing layer 18 is formed from polyethylene, and has a thickness of about 80 microns.

Figure 9:
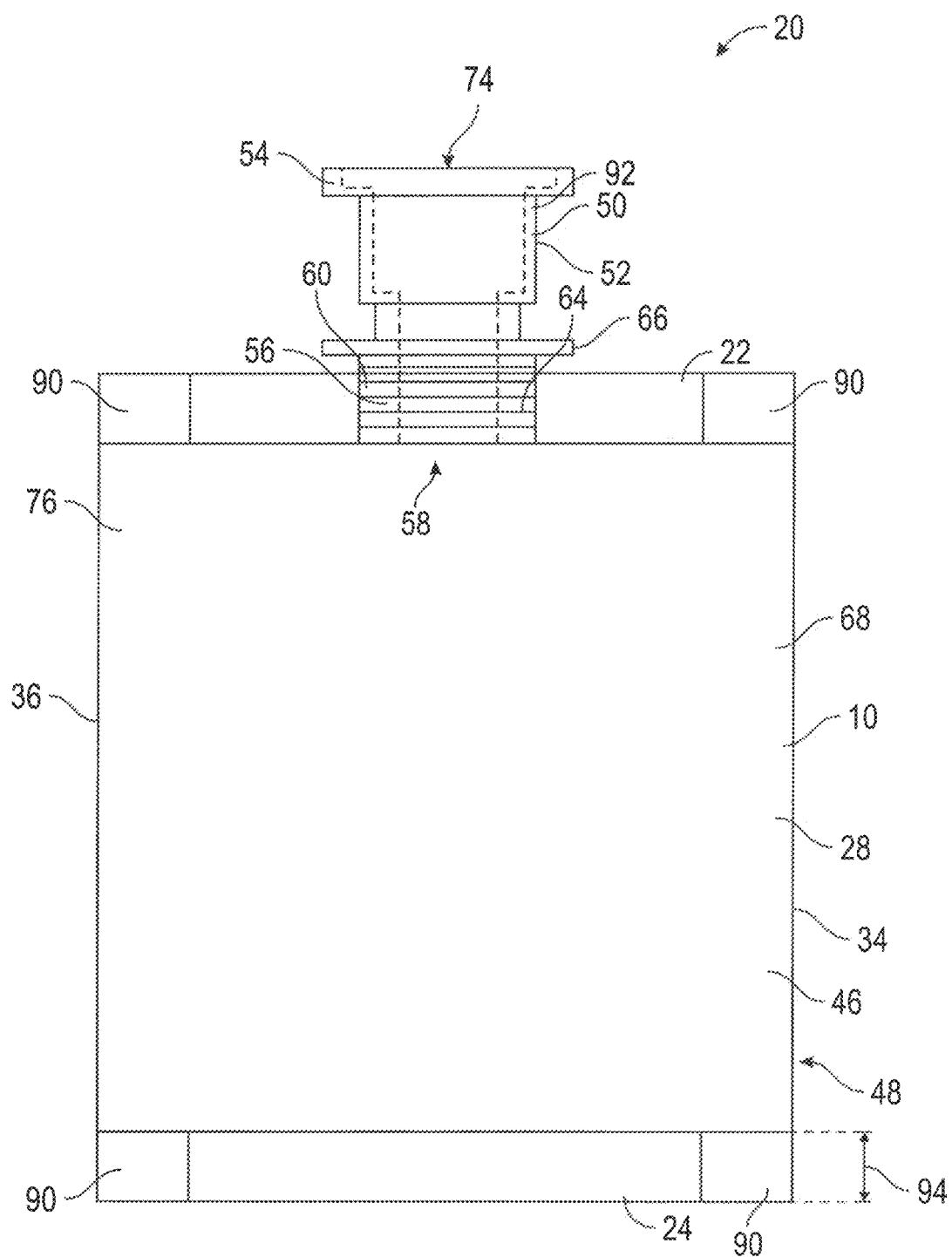
FIG. 9 is a front view of a gusseted pouch formed from the cut section of tube shown in FIG. 6 and the spout shown in FIG. 8.

The film 10 is thin, transparent, and flexible, and can be used to produce products such as the gusseted pouch 20 shown in FIG. 9. The cyclic olefin copolymer in the alcohol barrier layer 16 is effective at preventing alcohol, including ethanol and isopropanol, from passing through the film 10. The film 10 is thus useful for storing alcohol, such as in the pouch 20, and in preventing the loss of alcohol by evaporation through the film 10.

The sealing layer 18 has a relatively low melting temperature of between 105 degrees Celsius and 115 degrees Celsius, which allows the sealing layer 18 to be melted to, for example, produce heat sealed top 22 and bottom 24 edges of the pouch 20 shown in FIG. 9. The sealing layer 18 can be melted by, for example, the heat sealing device 26 shown in FIG. 5, as is described in more detail below.

The barrier layer 14 has a higher melting point than the sealing layer 18, preferably above 150 degrees Celsius. In some embodiments, the melting temperature of the barrier layer 14 is 220 degrees Celsius or more. This higher melting temperature allows heat to be applied to the film 10 via the barrier layer 14, such as by the heat sealing device 26, so as to melt the sealing layer 18 without also melting the barrier layer 14. The barrier layer 14 and the film 10 itself is thus prevented from adhering to the heat sealing device 26. The barrier layer 14 is also puncture resistant, which further enhances the film's 10 usefulness as packaging for liquid materials, such as alcohol and alcohol based solutions, which would leak out of even minute holes in the film 10. The melting temperature of the barrier layer 14 is preferably at least about 20 to 80 degrees Celsius above the melting temperature of the sealing layer 18.

The alcohol barrier layer 16 also preferably has a higher melting temperature than the sealing layer 18. This helps to keep the alcohol barrier layer 16 intact, with a uniform thickness, in the area where the film 10 is heat sealed, thereby maintaining the desired alcohol barrier properties of the film 10 in the heat sealed area.

The layers 14, 16, 18 of the film 10 are preferably selected to adhere to each other, and to remain bonded under a wide range of conditions. For example, the layers 14, 16, 18 are preferably selected to remain bonded when the film 10 is heated, such as during heat sealing. The layers 14, 16, 18 are also preferably selected to remain bonded together when the film 10 is exposed to concentrated alcohol for extended periods of time.

Figure 4:
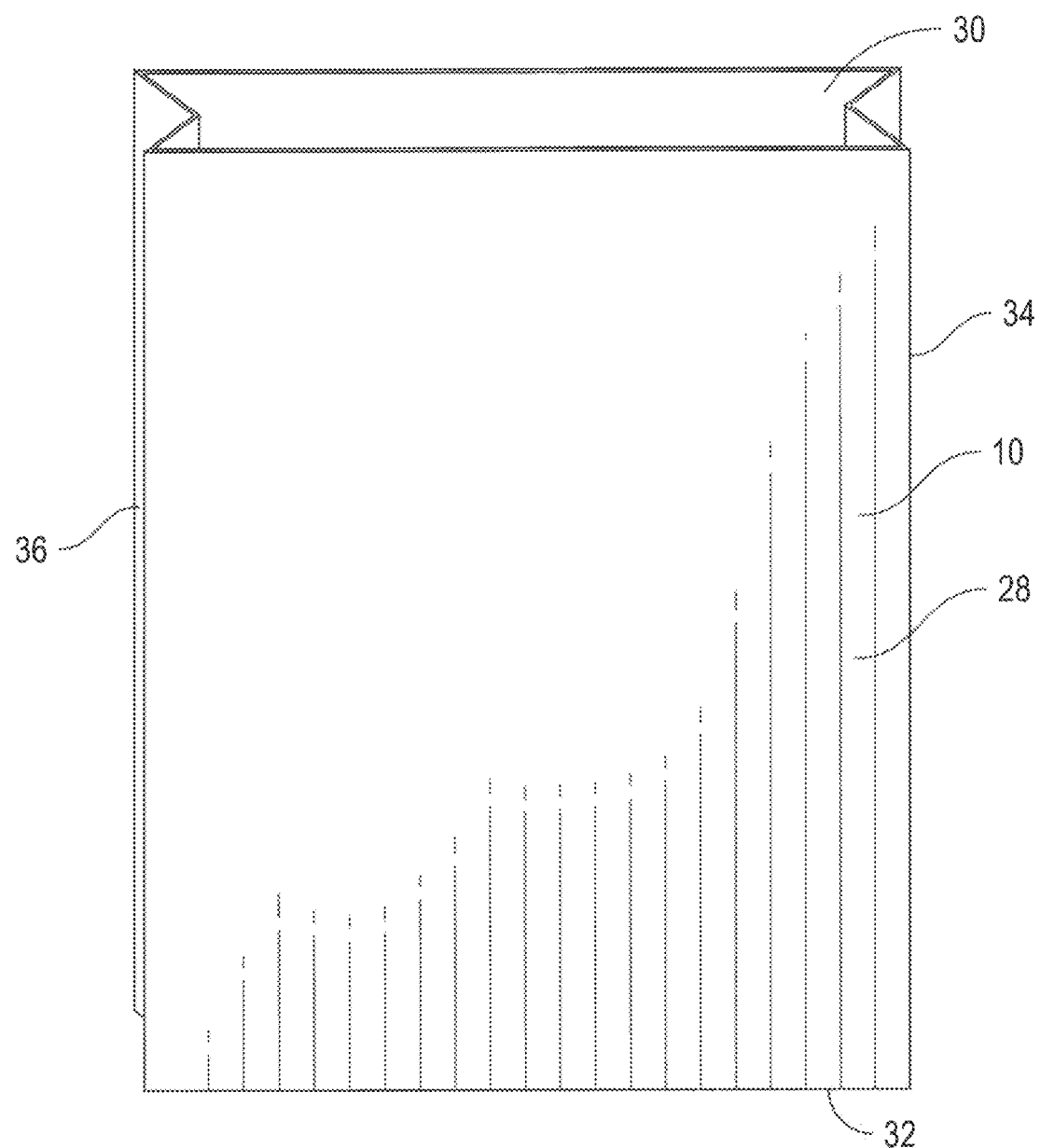
FIG. 4 is a perspective view of the cut section of tube shown in FIG. 3, with the sides of the cut section folded inwards.

The process by which the pouch 20 is produced from the film 10 will now be described with reference to FIGS. 1 to 9. The film 10 is initially extruded as a tube 12, as shown in FIGS. 1 and 2. After extrusion, the tube 12 is then cooled and rolled in accordance with known methods. The rolled tube 12 can then be placed in storage, or can proceed directly to further processing. When ready for further processing, the tube 12 is cut transversely at spaced intervals to produce the cut section 28 shown in FIG. 3. The cut section 28 has an open top end 30 and an open bottom end 32. The film 10 is then folded inwardly at opposite sides of the cut section 28 of tube 12 to form two folded sides 34, 36, as shown in FIG. 4.

Figure 5:
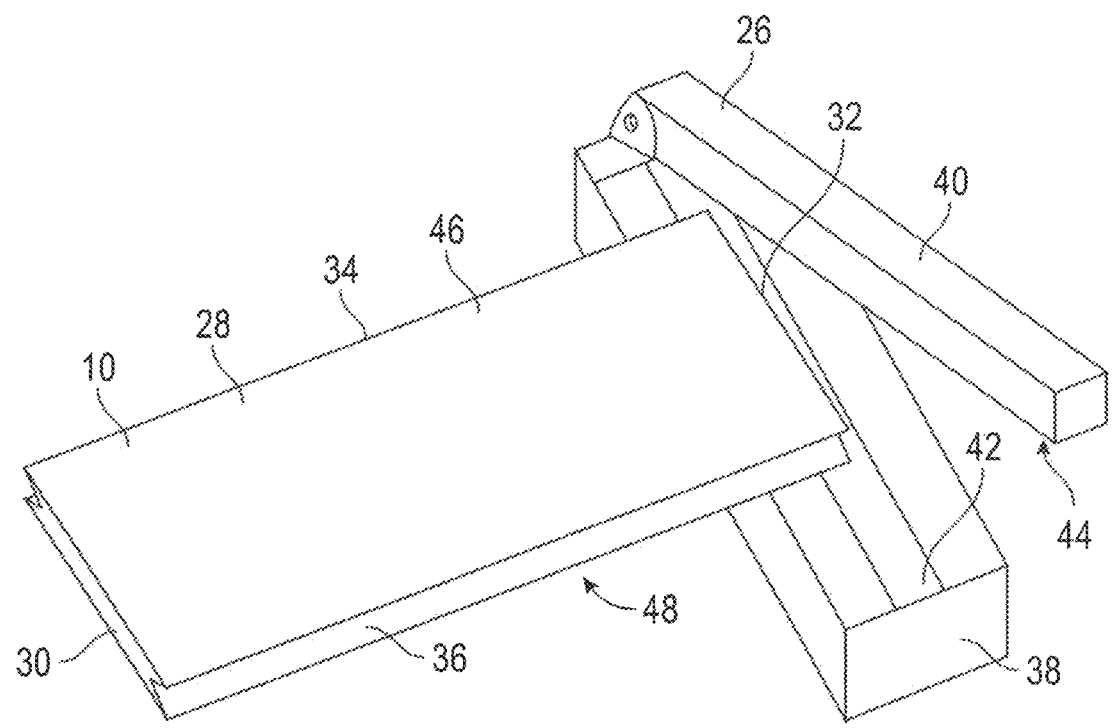
FIG. 5 is a perspective view of the cut section of tube shown in FIG. 4, with the bottom end of the cut section placed in a heat sealing device.

The open bottom end 32 of the cut section 28 of tube 12 is then placed in a heat sealing device 26, as shown in FIG. 5. The heat sealing device 26 has a base portion 38 and a sealing bar 40 that is movably hinged to the base portion 38. The base portion 38 has a heated strip 42 on its upper surface, and the sealing bar 40 has a heated strip 44 on its lower surface. The heated strips 42, 44 are configured to heat to a temperature that is greater than the melting temperature of the sealing layer 18, but lower than the melting temperature of the barrier layer 14.

Figure 6:
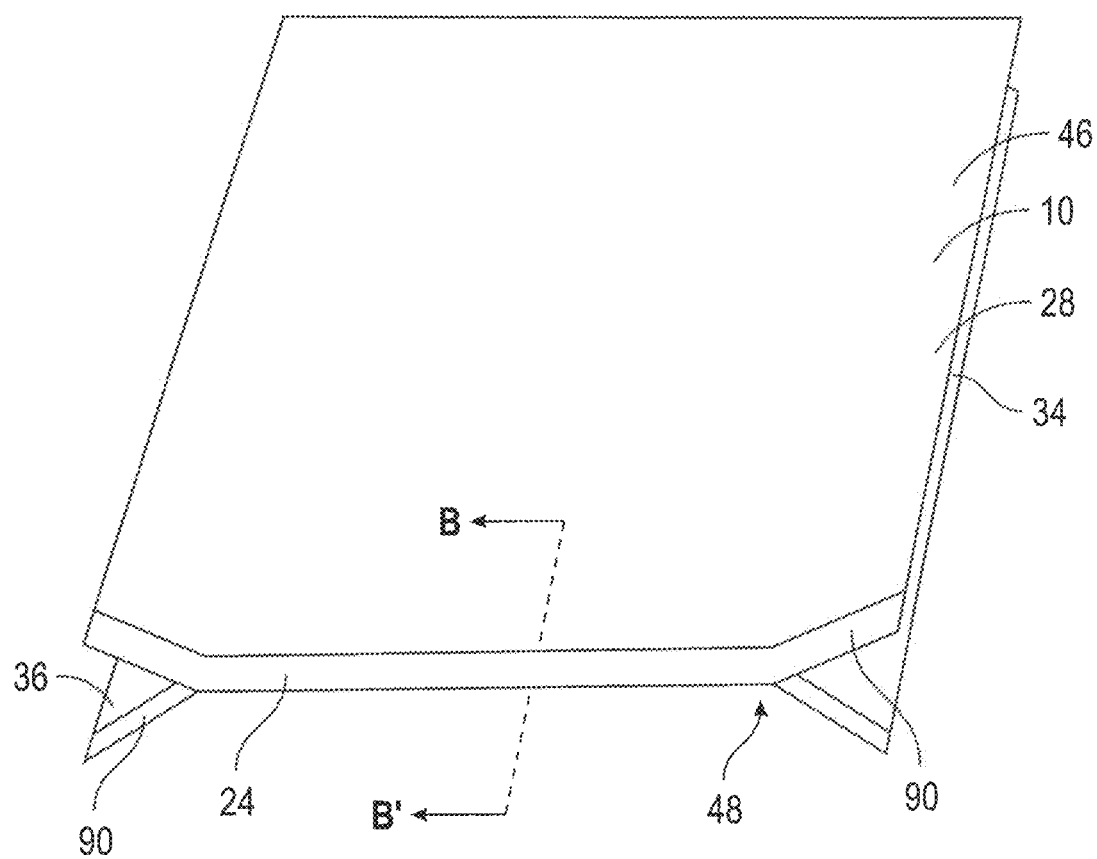
FIG. 6 is a perspective view of the cut section of tube shown in FIG. 5, with a heat sealed bottom edge.
Figure 7:
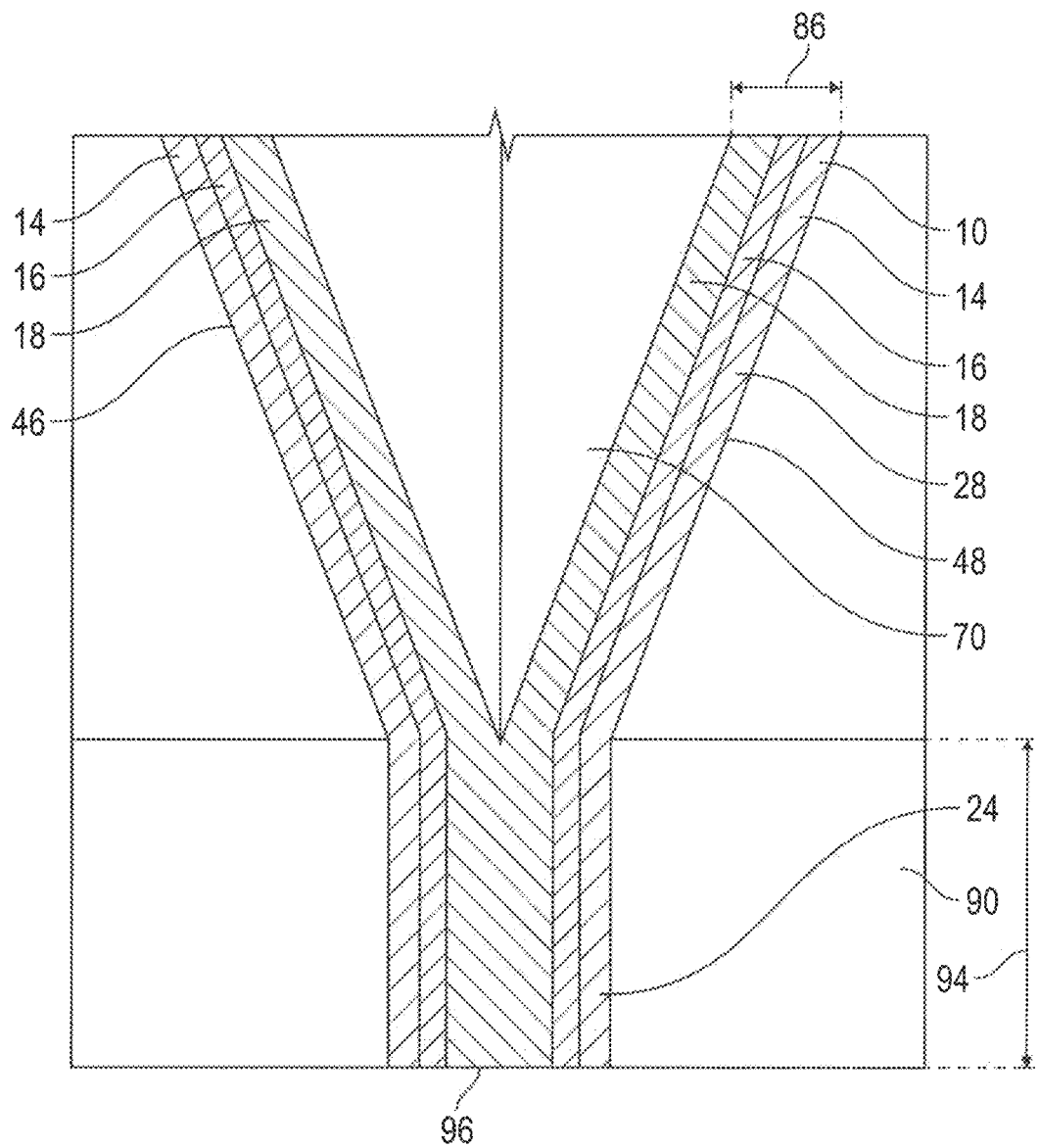
FIG. 7 is a cross-sectional view of the cut section of tube shown in FIG. 6 along section line B-B', shown not to scale to better illustrate the layers of the film.

To heat seal the bottom end 32 of the cut section 28 of tube 12, the heated sealing bar 40 is pressed downwardly onto the bottom end 32 of the cut section 28, with the bottom end 32 positioned between the heated strip 42 of the base portion 38 and the heated strip 44 of the sealing bar 40. The heat from the heated strips 42, 44 is transferred by conduction into the sealing layer 18 through the barrier layer 14 and the alcohol barrier layer 16. Since the temperature is above the melting temperature of the sealing layer 18, this causes the sealing layer 16 to melt. When the cut section 28 of tube 12 is flattened by the downwards pressure of the sealing bar 40, the sealing layer 16 on a front portion 46 of the cut section 28 is moved into contact with the sealing layer 16 on a back portion 48 of the cut section 28. The heat from the heat sealing device 26 causes the sealing layer 16 on the front portion 46 of the cut section 28 to melt and adhere to the sealing layer 16 on the back portion 48, forming the heat sealed bottom edge 24 as shown in FIGS. 6 and 7. The bottom edge 24 has forked side portions 90 formed from the sealing of the folded sides 34, 36, which gives the pouch 20 a gusseted construction.

Figure 8:
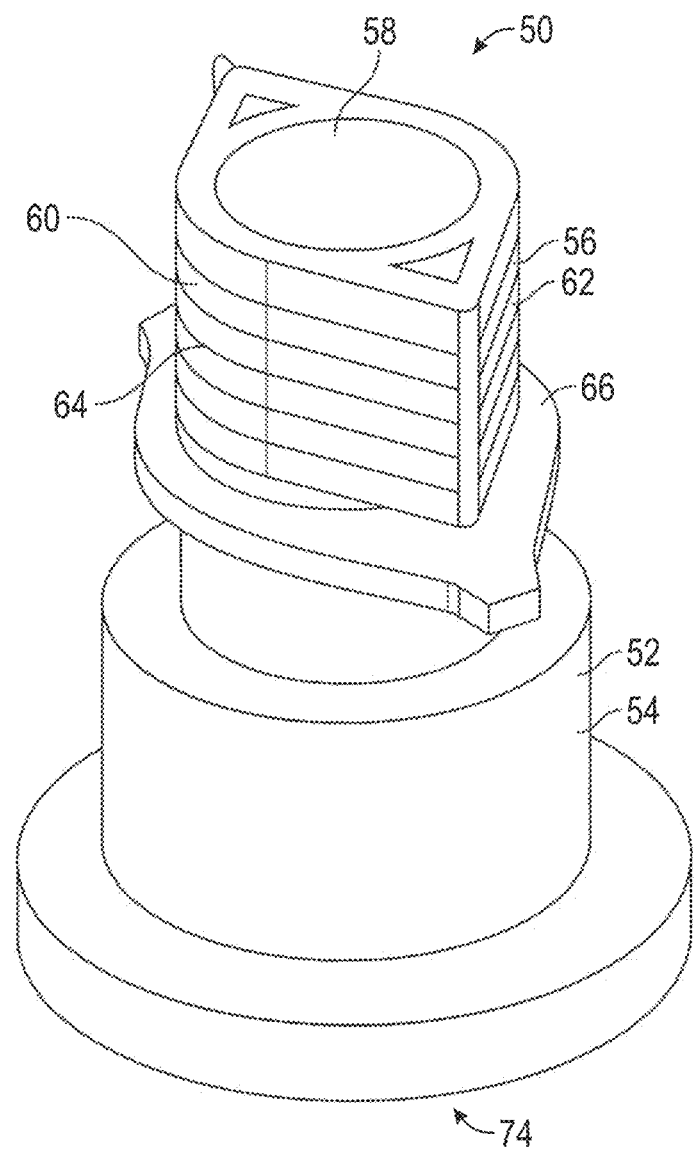
FIG. 8 is a perspective view of a spout.

In addition to the cut section 28 of film 10, the finished pouch 20 also includes a spout 50, which is best shown in FIG. 8. The spout 50 has an injection molded polyethylene body 52, which includes an outlet portion 54 and a sealing portion 56. The sealing portion 56 has an inlet opening 58 that is in fluid communication with an outlet opening 74 of the outlet portion 54. A passageway 92, shown in dotted lines in FIG. 9, connects the inlet opening 58 and the outlet opening 74.

The sealing portion 56 of the spout body 52 has two tapered sealing surfaces 60, 62 that each carry a number of horizontal polyethylene ridges 64. A guide collar 66 extends outwardly from the spout body 52 immediately below the sealing portion 56.

To assemble the pouch 20, the sealing portion 56 of the spout body 52 is placed into the open top end 30 of the cut section 28 of film 10. The guide collar 66 remains outside of the open top end 30, and helps to position the sealing portion 56 in place. The top end 30 of the cut section 28 is then heat sealed to produce the heat sealed top edge 22, as shown in FIG. 9. The sealing portion 56 of the spout body 52 traverses the heat sealed top edge 22 and is heat sealed in place between the front portion 46 and the back portion 48 of the pouch 20. The top edge 22 can be heat sealed by a device similar to the heat sealing device 26 shown in FIG. 5, but which preferably includes a modified base portion 38 and sealing bar 40, not shown, which are shaped to accommodate the sealing portion 56 of the spout body 52. The polyethylene ridges 64 on the sealing portion 56 assist in heat sealing the spout body 52 in place by providing a textured surface for the melted sealing layer 18 to adhere to. In some preferred embodiments, the ridges 64 themselves melt during the heat sealing process, thereby providing an even stronger bond between the spout body 52 and the film 10. The top edge 22 has forked side portions 90 formed from the sealing of the folded sides 34, 36, similarly to the bottom edge 24.

As shown in FIG. 9, the completed pouch 20 includes the spout 50 and a pouch body 68 that is formed from the cut section 28 of the film 10. The pouch body 68 has an internal chamber 70 that is defined between the front portion 46, the back portion 48, the top edge 22, the bottom edge 24, and the sides 34, 36. The internal chamber 70 is best seen in FIG. 7.

The heat sealed top and bottom edges 22, 24 of the pouch body 68 are air tight, and prevent fluid from entering or exiting the internal chamber 70 other than through the spout 50. The internal chamber 70 is in fluid communication with the spout 50 via the inlet opening 58.

The pouch 20 can be used to store alcohol or products containing alcohol, preferably in ranges in excess of 40%, or more preferably 70% to 95% or more, such as a concentrated alcohol-based hand sanitizer 72 containing ethanol or isopropanol. The hand sanitizer 72 is stored within the internal chamber 70 of the pouch 20. To fill the internal chamber 70, the hand sanitizer 72 can be delivered through the spout 50 by a filling device, not shown. Once full, the outlet opening 74 of the spout 50 is preferably sealed to prevent the hand sanitizer 72 from leaking out of the pouch 20, such as with a sealing cap, not shown. The filled pouch 20 can then be placed in storage or transported to another facility or location where the hand sanitizer 72 is needed.

The alcohol barrier layer 16 in the film 10 helps to prevent the alcohol contained in the hand sanitizer 72 from evaporating or otherwise leaking out of the pouch 20. The spout body 52, which is formed from relatively thick polyethylene having a thickness of about 1 mm, also helps to prevent the alcohol from evaporating. In particular, the thickness of the polyethylene acts as a barrier that prevents the alcohol from passing through the spout body 52, despite the absence of cyclic olefin copolymer in this part of the pouch 20.

As best seen in FIG. 7, the alcohol barrier layer 16 does not extend across the heat sealed bottom edge 24. To prevent alcohol from leaking out, the bottom edge 24 preferably has a width 94 in the range of 0.5 to 2 cm. Although not shown in FIG. 7, which is not to scale, the width 94 of the bottom edge 24 is several orders of magnitude greater than the thickness 86 of the film 10. This interposes a long segment of the heat sealed sealing layer 16 between the internal chamber 70 and the bottom surface 96 of the bottom edge 24, which helps to prevent alcohol from passing through the bottom edge 24. The top edge 22 has a similar construction.

In other embodiments, the spout 50 may optionally incorporate a layer or a blend of cyclic olefin copolymer, to increase the alcohol barrier properties thereof. The top and bottom edges 22, 24 may also incorporate additional cyclic olefin copolymer, such as by applying a layer of cyclic olefin copolymer to the bottom surface 96 of the bottom edge 24.

Figure 10:
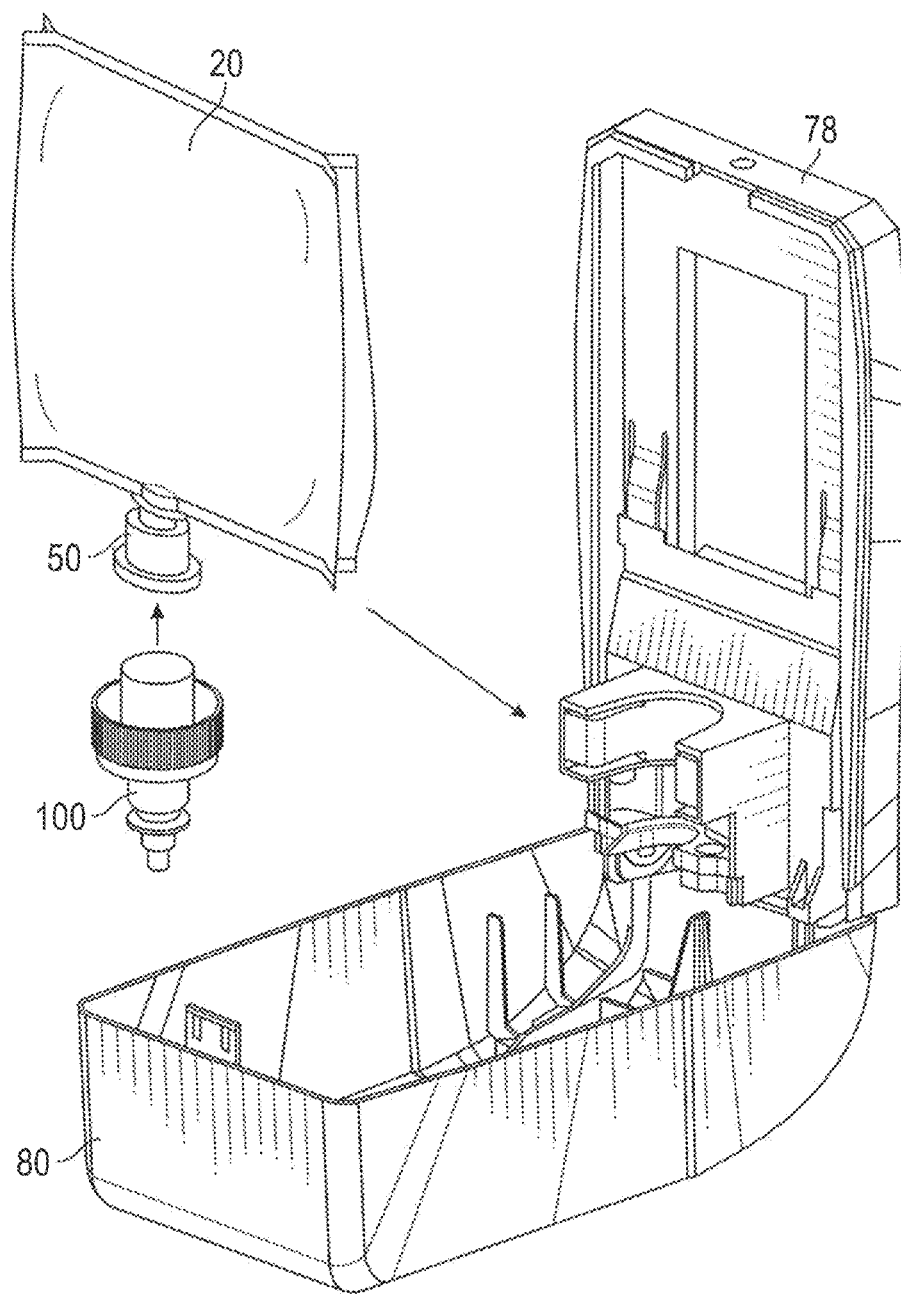
FIG. 10 is a partially exploded perspective view of a fluid dispenser, with a housing of the dispenser shown in an open condition for receiving the pouch as shown in FIG. 9 as a reservoir for hand sanitizer.
Figure 11:
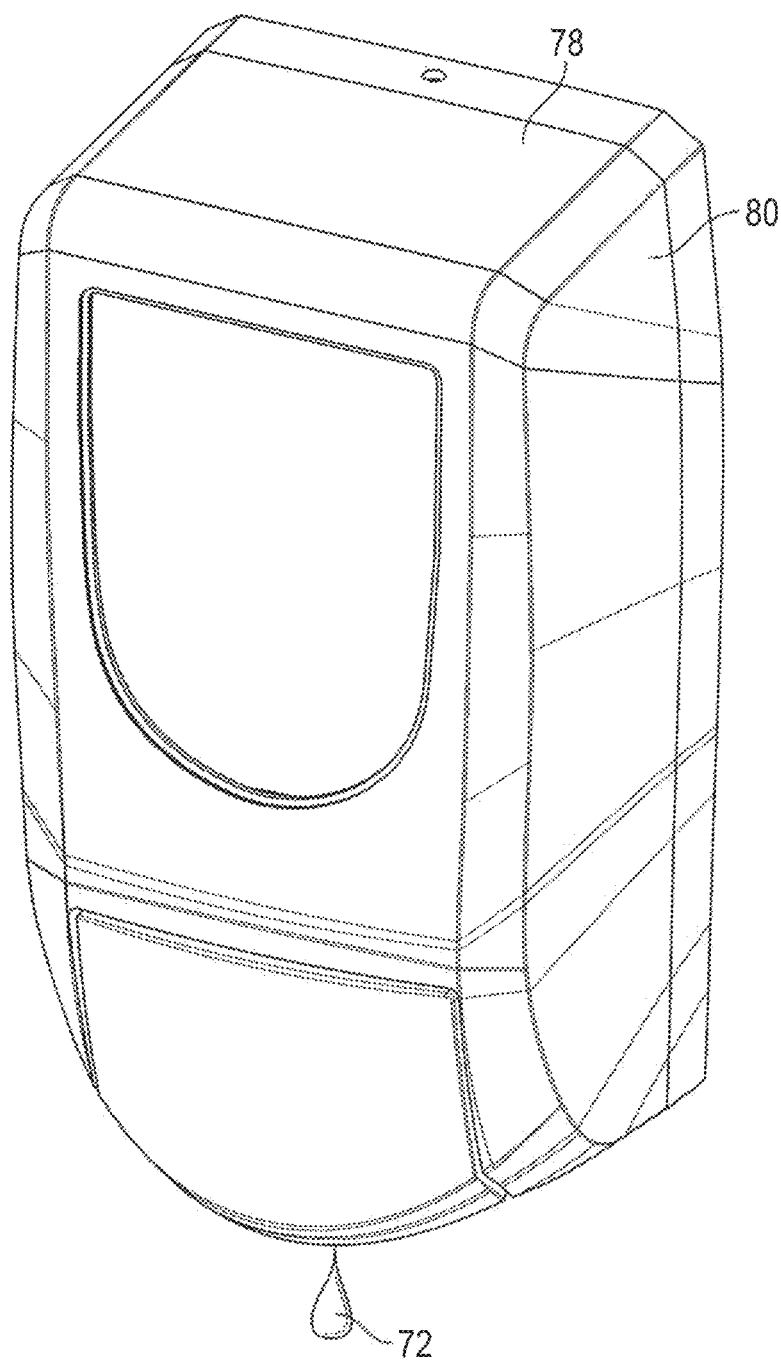
FIG. 11 is a perspective view of the fluid dispenser shown in FIG. 10, with the housing of the dispenser shown in a closed condition and dispensing hand sanitizer from the pouch.

The pouch 20 can be used as a reservoir 76 for hand sanitizer 72 to be dispensed from a hand sanitizer dispenser 78, such as the dispenser 78 shown in FIGS. 10 and 11. The pouch 20 can be placed inside a housing 80 of the dispenser 78, for dispensing the hand sanitizer 72 when the dispenser 78 is activated. A fluid pump 100 is inserted into the outlet opening 74 of the spout 50 for drawing hand sanitizer 72 from the pouch 20 and dispensing it when the dispenser 78 is activated. The fluid pump 100 is similar to the pump assembly described in US 2015/0190827 to Ophardt et al., published Jul. 9, 2015, which is incorporated herein by reference.

The flexible nature of the film 10 allows the pouch 20 to collapse as the hand sanitizer 72 is dispensed therefrom. This allows the internal chamber 70 to remain airless, since the dispensed hand sanitizer 72 does not need to be replaced by air as it would in a rigid container. The cyclic olefin copolymer in the alcohol barrier layer 16 furthermore prevents the alcohol contained in the hand sanitizer 72 from evaporating or otherwise leaking out from the pouch 20 while the pouch 20 is held within the housing 80 of the dispenser 78. The hand sanitizer 72 is thus able to maintain a high alcohol concentration until it is dispensed.

Reference is now made to FIGS. 12 to 15, which show a pouch 20 with a fluid pump 100 in accordance with a second embodiment of the invention. The pouch 20 is identical to the pouch 20 shown in FIG. 9, with the exception that it is slightly elongated. Like numerals are used to denote like components.

The pouch 20 is formed from the multilayer film 10 shown in FIG. 2, and is manufactured using the same process as described above with reference to the first embodiment. As in the first embodiment, the pouch 20 is intended for use as a reservoir 76 for hand sanitizer 72 that is to be dispensed from a hand sanitizer dispenser 72. The fluid pump 100 is inserted into the pouch 20 to dispense the hand sanitizer 72.

The fluid pump 100 is similar to the pumps described in U.S. Pat. No. 9,175,674 to Ophardt et al., issued Nov. 3, 2015, U.S. Pat. No. 8,365,954 to Ophardt et al, issued Feb. 5, 2013, U.S. Pat. No. 9,437,103 to Ophardt, issued Sep. 6, 2016, US 2008/0121664 to Ophardt et al., published May 29, 2008, U.S. Pat. No. 7,765,918 to Ophardt et al., issued Aug. 3, 2010, U.S. Pat. No. 7,798,369 to Ophardt, issued Sep. 21, 2010, US 2008/0112830 to Ophardt et al., published May 15, 2008, and U.S. Pat. No. 8,074,844 to Ophardt et al., issued Dec. 13, 2011, each of which is incorporated herein by reference.

Figure 13:
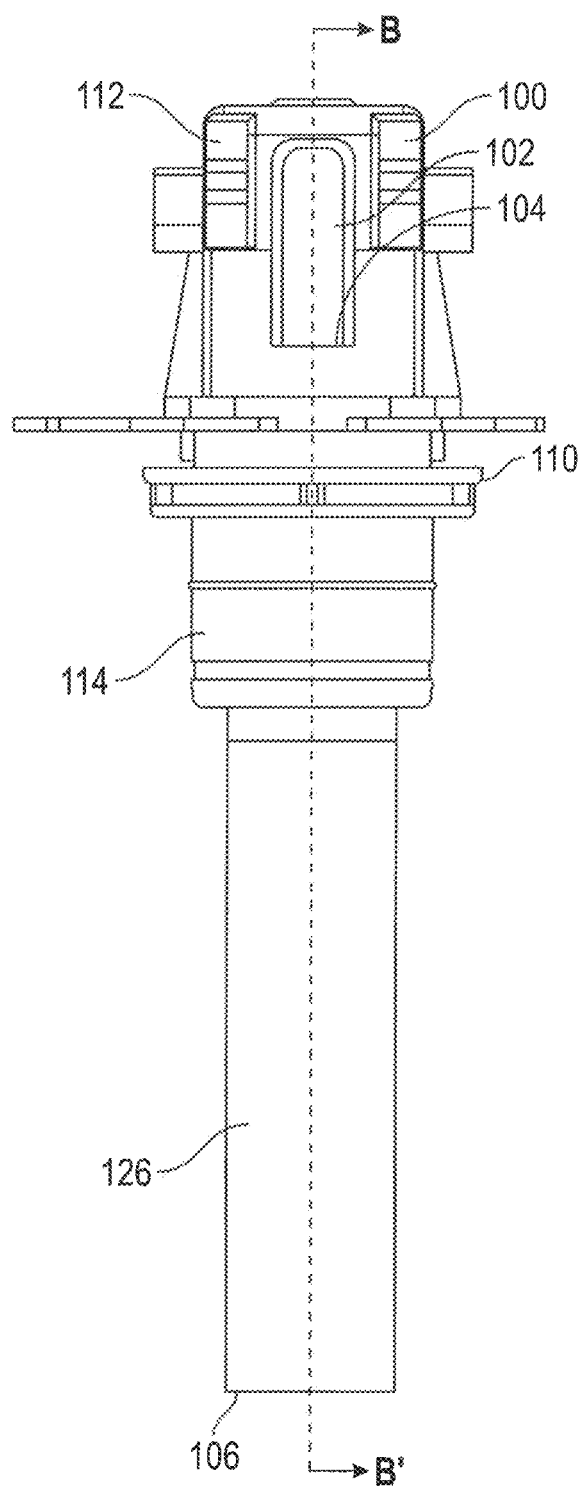
FIG. 13 is a front view of the fluid pump shown in FIG. 12.
Figure 14:
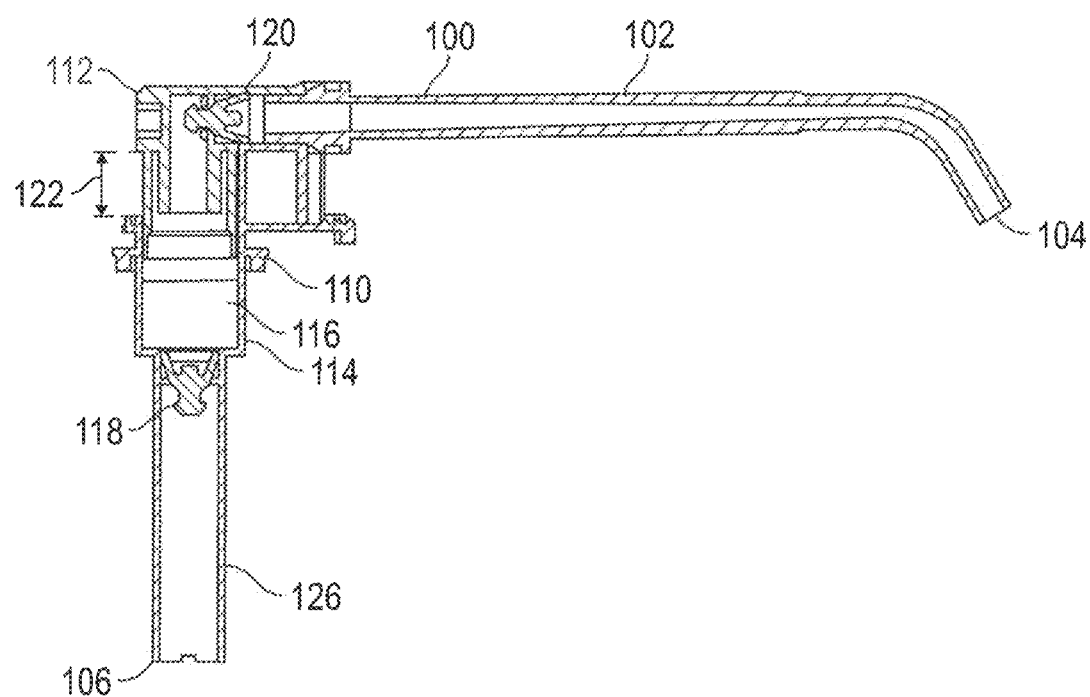
FIG. 14 is a cross-sectional view of the fluid pump shown in FIG. 13 along section line B-B.
Figure 15:
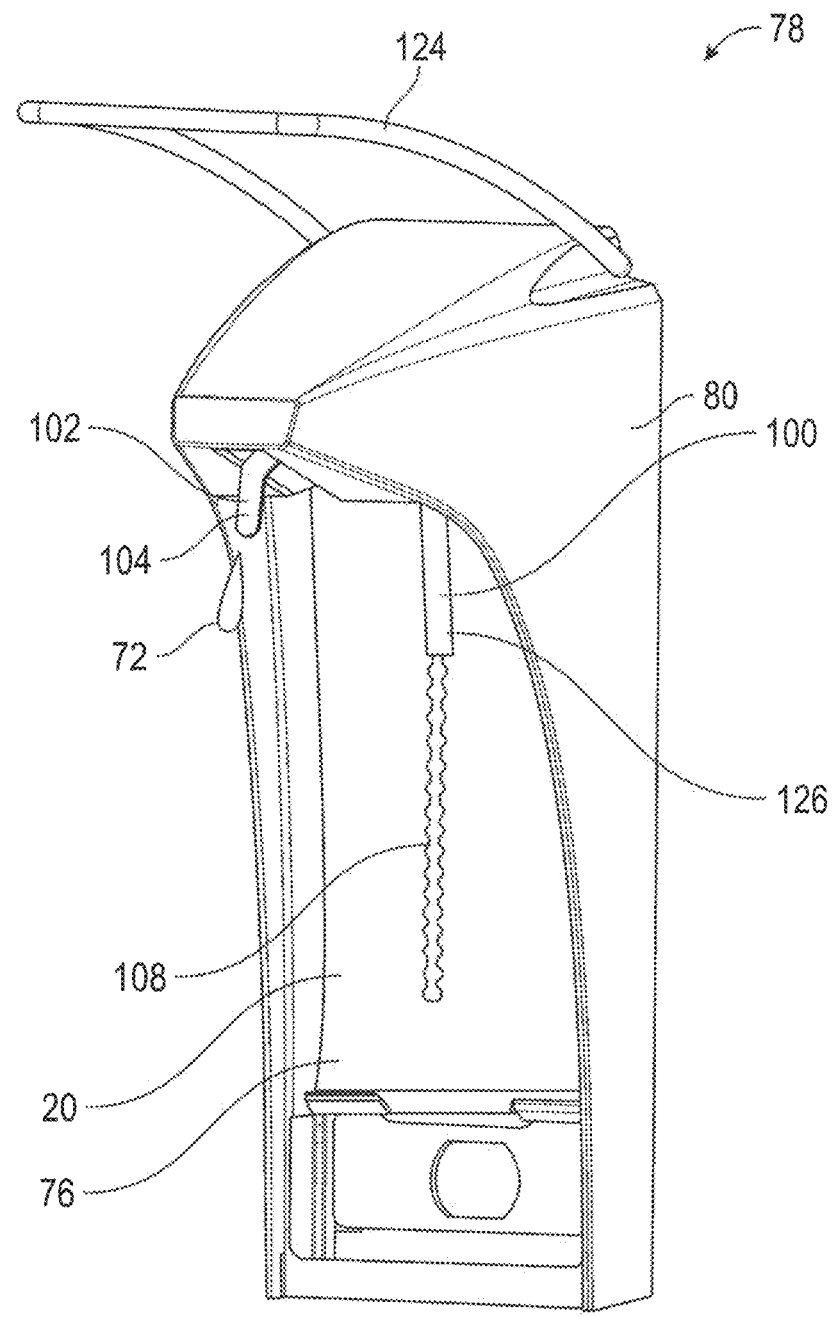
FIG. 15 is a perspective view of a fluid dispenser dispensing hand sanitizer from the pouch shown in FIG. 12.

As best seen in FIGS. 13 and 14, the fluid pump 100 includes an elongated spout 102, a piston forming body 112, a piston chamber forming body 114, and an inlet tube 126. The piston forming body 112 and the piston chamber forming body 114 together define a piston chamber 116, which is in fluid communication with the elongated spout 102 and the inlet tube 126. The piston forming body 112 is axially slidable within the piston chamber forming body 114 to alter the volume of the piston chamber 116. From the initial position shown in FIG. 14, the piston forming body 112 is axially slidable into the piston chamber forming body 114, up to a maximum stroke distance 122, thereby reducing the volume of the piston chamber 116. The piston forming body 112 is also axially slidable away from the piston chamber forming body 114 to return to the initial position shown in FIG. 14, thereby increasing the volume of the piston chamber 116.

The inlet tube 126 extends axially downwards from the piston chamber forming body 114 to a fluid inlet 106. A one-way fluid inlet valve 118 is interposed between the inlet tube 126 and the piston chamber 116, and prevents fluid from passing from the piston chamber 116 into the inlet tube 126, while permitting fluid to pass from the inlet tube 126 into the piston chamber 116.

The elongated spout 102 extends laterally from the piston forming body 112 to a fluid outlet 104. The spout 102 extends horizontally for most of its length, with a slight downwards curve adjacent to the fluid outlet 104. A one-way fluid outlet valve 120 is interposed between the spout 102 and the piston chamber 116, and prevents fluid from passing from the spout 102 into the piston chamber 116, while permitting fluid to pass from the piston chamber 116 into the spout 102. The one-way fluid inlet valve 118 and the one-way fluid outlet valve 120 are shown in FIG. 14 as conventional umbrella valves, although any suitable alternative one-way valves could be used instead.

Figure 12:
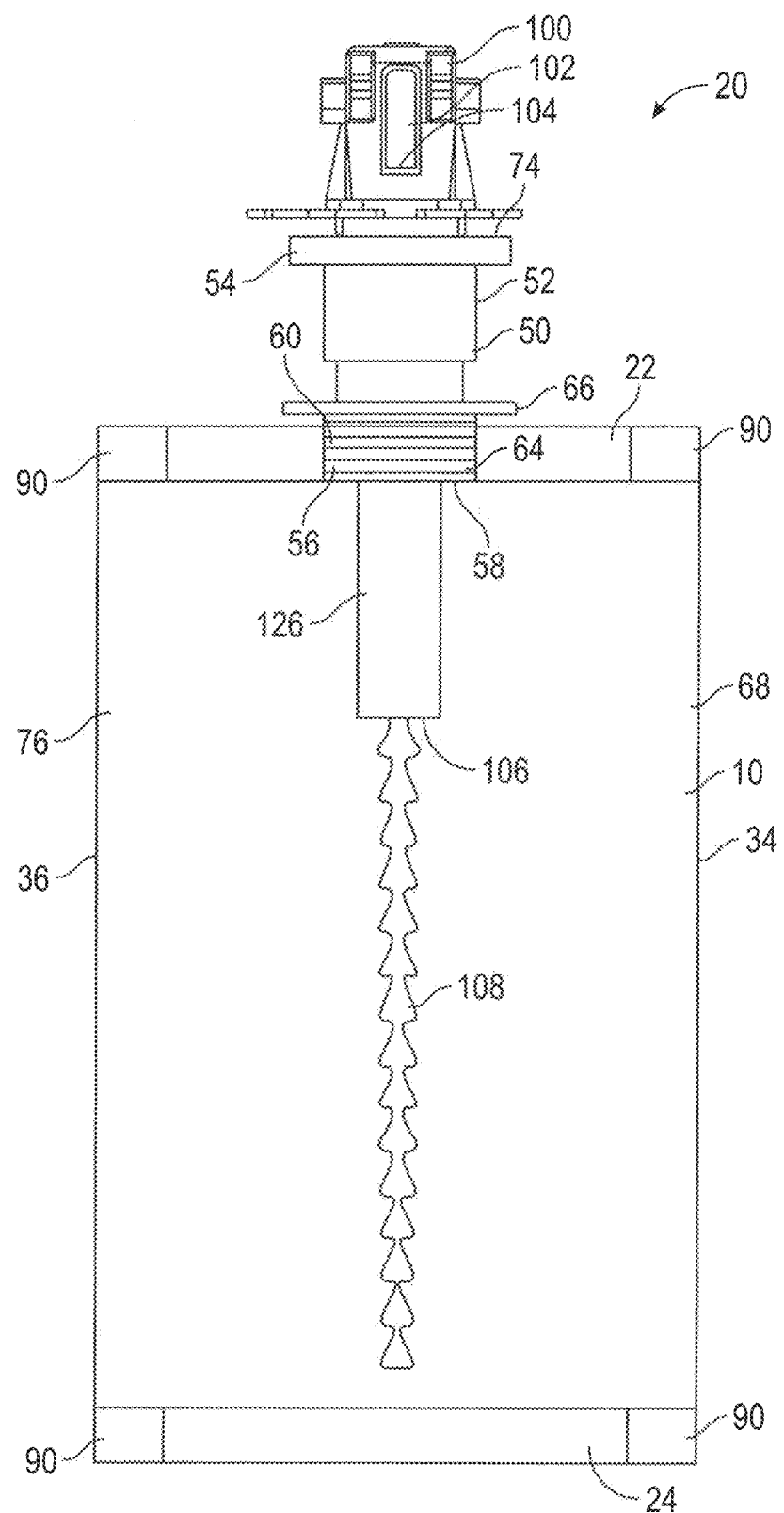
FIG. 12 is a front view of a pouch with a fluid pump in accordance with a second embodiment of the invention.

As best seen in FIG. 13, the fluid pump 100 has a sealing disc 110 that extends annularly outwards from the piston chamber forming body 114. The sealing disc 110 is configured to sealingly engage with the outlet opening 74 of the spout 50 when the fluid pump 100 is inserted into the pouch 20, as shown in FIG. 12. In some embodiments, the sealing disc 110 optionally has a threaded outer surface for engaging with a threaded inner surface of the outlet opening 74. When the fluid pump 100 is inserted into the pouch 20, the inlet tube 126 extends through the passageway 92 of the spout 50 and into the internal chamber 70 of the pouch 20, with the fluid inlet 106 in fluid communication with the internal chamber 70. Optionally, a capillary bar 108 extends from the fluid inlet 106. The capillary bar 108 is a long plastic filament with ridged edges that extends downwards from the fluid inlet 106 towards the bottom edge 24 of the pouch 20. The capillary bar 108 may be inserted into the fluid inlet 106 without rigid attachment, or may be attached to the fluid inlet 106 by suitable means such as a friction fit slot or the like, not shown. The film 10 is transparent in the embodiment shown in FIG. 12, and so the capillary bar 108 is visible from outside the pouch 20.

As in the first embodiment, the pouch 20 can be used as a reservoir 76 for a hand sanitizer dispenser 78. The fluid pump 100 is adapted for use with the dispenser 78 shown in FIG. 15. The dispenser 78 is similar to those described in US 2017/0105584 to Ophardt et al., published Apr. 20, 2017, U.S. Pat. No. 7,748,573 to Ophardt et al., issued Jul. 6, 2010, U.S. Pat. No. 9,437,103 to Ophardt, issued Sep. 6, 2016, and U.S. Pat. No. 8,074,844 to Ophardt et al., issued Dec. 13, 2011, each of which is incorporated herein by reference.

The pouch 20 is configured to sit within the housing 80 of the dispenser 78, with the fluid outlet 104 accessible at the front of the dispenser 78. An actuation bar 124 is operatively connected to the fluid pump 100 for activating the pump 100 and dispensing the hand sanitizer 72 from the pouch 20. When the actuation bar 124 is depressed, the piston forming body 112 is moved axially downwards relative to the piston chamber forming body 114, thereby reducing the volume of the piston chamber 116. This pressurizes hand sanitizer 72 contained in the piston chamber 116, causing the hand sanitizer 72 to move past the one-way fluid outlet valve 120 and through the spout 102 to be dispensed from the fluid outlet 104. The dispensed hand sanitizer 72 can be received, for example, by a user's hand positioned below the fluid outlet 104.

When the actuation bar 124 is released, the dispenser 78 is configured to move the piston forming body 112 axially upwards relative to the piston chamber forming body 114, for example under the biasing force of a spring, not shown. This increases the volume of the piston chamber 116, creating a vacuum that draws hand sanitizer 72 from the pouch 20 past the one-way inlet valve 118 and into the piston chamber 116. The piston chamber 116 is thus primed for further dispensing of hand sanitizer 72 upon activation of the actuation bar 124. The fluid pump 100 typically needs to be primed when first installed in the dispenser 78 by depressing and releasing the actuation bar 124 one or more times, to fill the piston chamber 116 with hand sanitizer 72 and remove any air contained therein.

As in the first embodiment, the flexible nature of the film 10 allows the pouch 20 to collapse as the hand sanitizer 72 is dispensed therefrom. This allows the internal chamber 70 to remain airless. Optionally, the capillary bar 108 is inserted into the pouch 20 to maintain an open pathway into the fluid inlet 106 as the pouch 20 collapses. In particular, the capillary bar 108 prevents the film 10 from covering and potentially sealing the fluid inlet 106 as the pouch 20 collapses. The ridges also help prevent the film 10 from forming a fluid tight seal against the capillary bar 108. The bar 108 thus holds the two sides of the pouch 20 apart along a region of the pouch 20 extending from the fluid inlet 106 towards the bottom edge 24, and provides a pathway for drawing hand sanitizer 72 into the fluid inlet 106 as the pouch 20 collapses. The effectiveness of the fluid pump 100 in drawing fluid from the pouch 20 is thereby improved, particularly for fluids with a higher viscosity.

Figure 16:
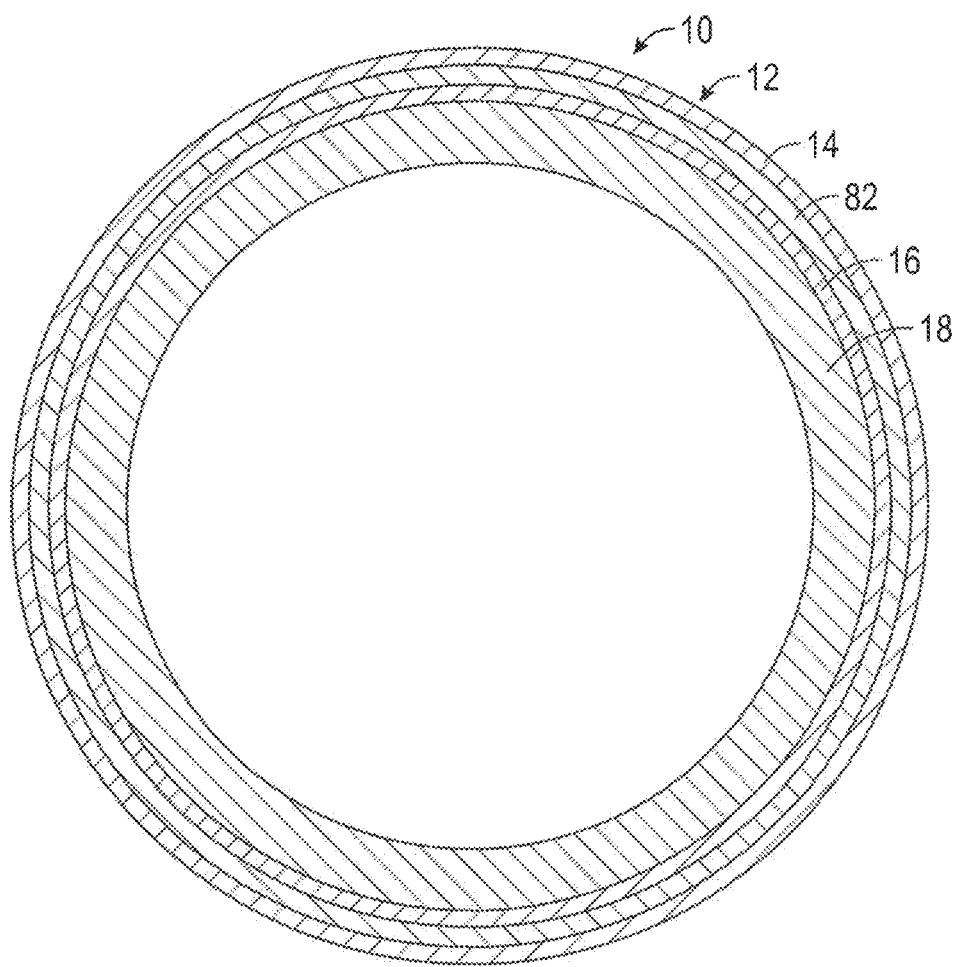
FIG. 16 is a cross-sectional view of a blow extruded multilayer film tube in accordance with a third embodiment of the invention, shown not to scale to better illustrate the layers of the film.

Reference is now made to FIG. 16, which shows a cross-sectional view of a tube 12 of film 10 in accordance with a third embodiment of the invention. The film 10 is identical to the first embodiment shown in FIGS. 1 and 2, with the exception that a tie layer 82 is included between the barrier layer 14 and the alcohol barrier layer 16. The tie layer 82 helps to adhere the barrier layer 14 to the alcohol barrier layer 16. The tie layer 82 is optionally formed from maleic anhydride grafted linear low-density polyethylene, and preferably has a thickness of about 10 microns.

The film 10 is produced by blown film coextrusion, as in the first embodiment, and can be used in exactly the same manner as in the first and second embodiments. For example, the film 10 can be used to produce the pouch 20 shown in FIG. 9 by following the same method as described above. The pouch 20 can be used to store alcohol, such as the hand sanitizer 72, with the alcohol barrier layer 16 preventing the alcohol from evaporating out of the pouch 20. As in the first and second embodiments, the pouch 20 can be used as a reservoir 76 for a hand sanitizer dispenser 78. The tie layer 82 provides additional adhesion between the layers 14, 16, and thus helps to prevent the pouch 20 from delaminating. Preferably, the tie layer 82 is selected to maintain its adhesion to the adjacent layers 14, 16 even when exposed to concentrated alcohol for an extended period of time.

In the third embodiment of the invention shown in FIG. 16, the barrier layer 14 is optionally formed from polycaprolactam, also known as PA6 or nylon 6, or polyethylene terephthalate, also known as PET. The alcohol barrier layer 16 is formed from cyclic olefin copolymer or a blend of cyclic olefin copolymer. The sealing layer 18 is optionally formed from low density polyethylene.

Figure 17:
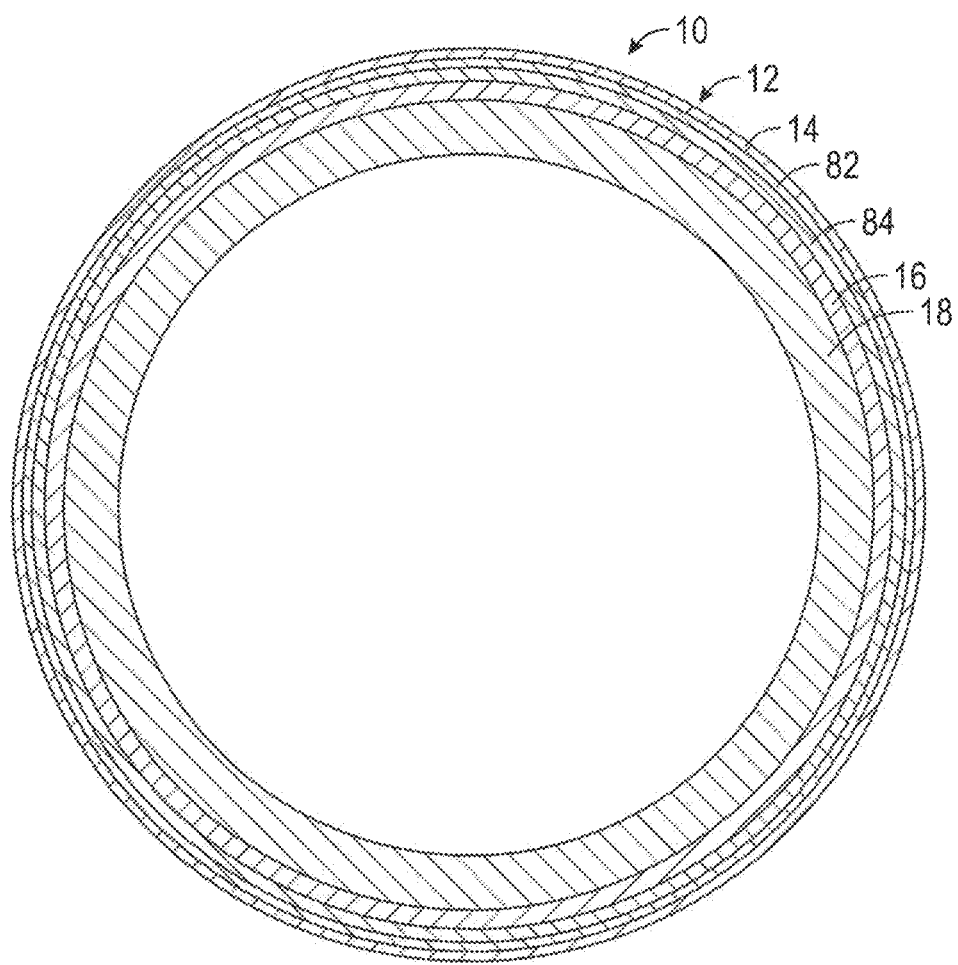
FIG. 17 is a cross-sectional view of a blow extruded multilayer film tube in accordance with a fourth embodiment of the invention, shown not to scale to better illustrate the layers of the film.

FIG. 17 shows a cross-sectional view of a tube 12 of film 10 in accordance with a fourth embodiment of the invention. The film 10 is identical to the third embodiment shown in FIG. 16, with the exception that a second alcohol barrier layer 84 is included between the barrier layer 14 and the tie layer 82. The second alcohol barrier layer 84 also helps to prevent alcohol from passing through the multilayer film 10. More specifically, the second alcohol barrier layer 84 is preferably selected to prevent gaseous alcohol from passing through the multilayer film 10. In some embodiments, the first alcohol barrier layer 16 is especially effective at preventing liquid alcohol from passing through the film 10. The two alcohol barrier layers 16, 84 can thus provide even more effective protection against the loss of alcohol through the film 10, compared to when only one alcohol barrier layer 16 is included. The second alcohol barrier layer 84 is formed from ethylene vinyl alcohol, and has a thickness of about 5 microns.

As in the previously described embodiments, the film 10 is produced by blown film coextrusion, and can be used in exactly the same manner as in the previous embodiments. The film 10 can, for example, be used to produce the pouch 20 shown in FIG. 9, or a similar reservoir 76 for a hand sanitizer dispenser 78.

Figure 18:
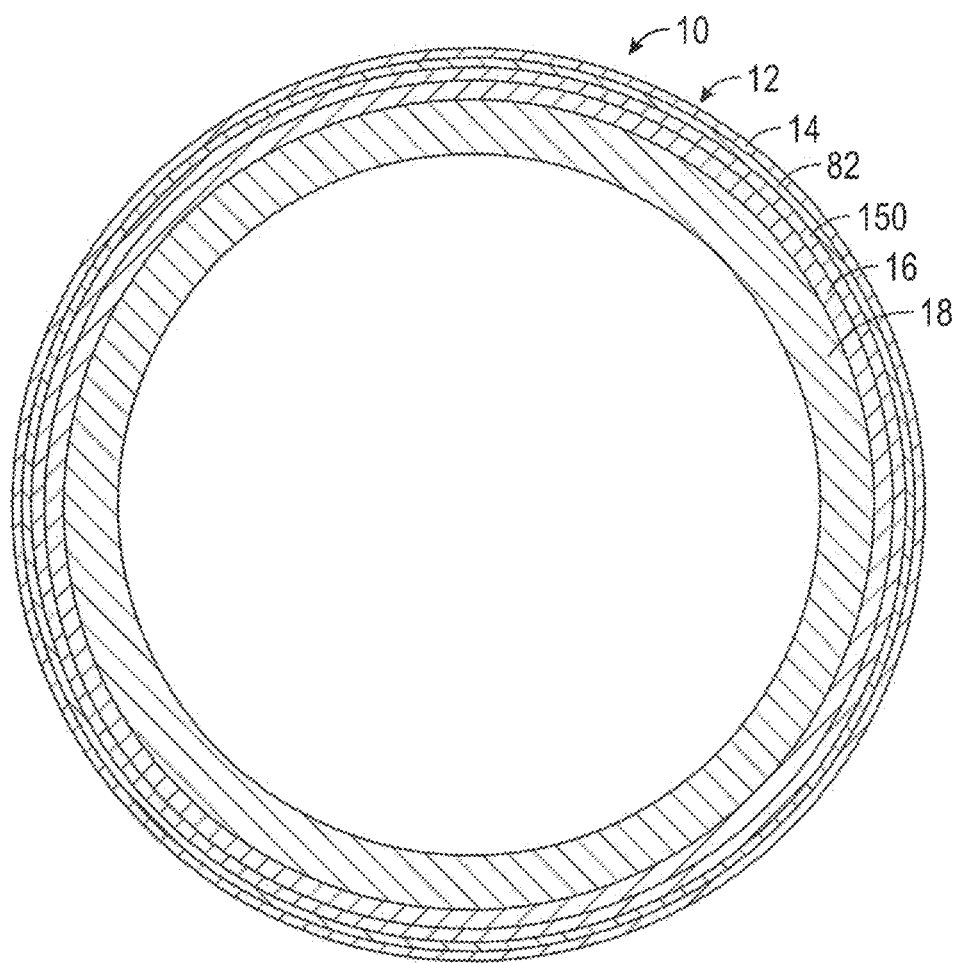
FIG. 18 is a cross-sectional view of a blow extruded multilayer film tube in accordance with a fifth embodiment of the invention, shown not to scale to better illustrate the layers of the film.

FIG. 18 shows a cross-sectional view of a tube 12 of film 10 in accordance with a fifth embodiment of the invention. The film 10 is identical to the third embodiment shown in FIG. 16, with the exception that a tear resistance layer 150 is included between the tie layer 82 and the alcohol barrier layer 16. The tear resistance layer 150 is preferably formed from low density polyethylene. The tear resistance layer 150 helps to increase the tear resistance of the film 10. The tear resistance layer 150 also preferably helps to prevent the alcohol barrier layer 16 from delaminating. In the embodiment shown in FIG. 18, the barrier layer 14 is preferably formed from polycaprolactam or polyethylene terephthalate, the alcohol barrier layer 16 is formed from cyclic olefin copolymer or a blend of cyclic olefin copolymer, and the sealing layer 18 is preferably formed from low density polyethylene.

Figure 19:
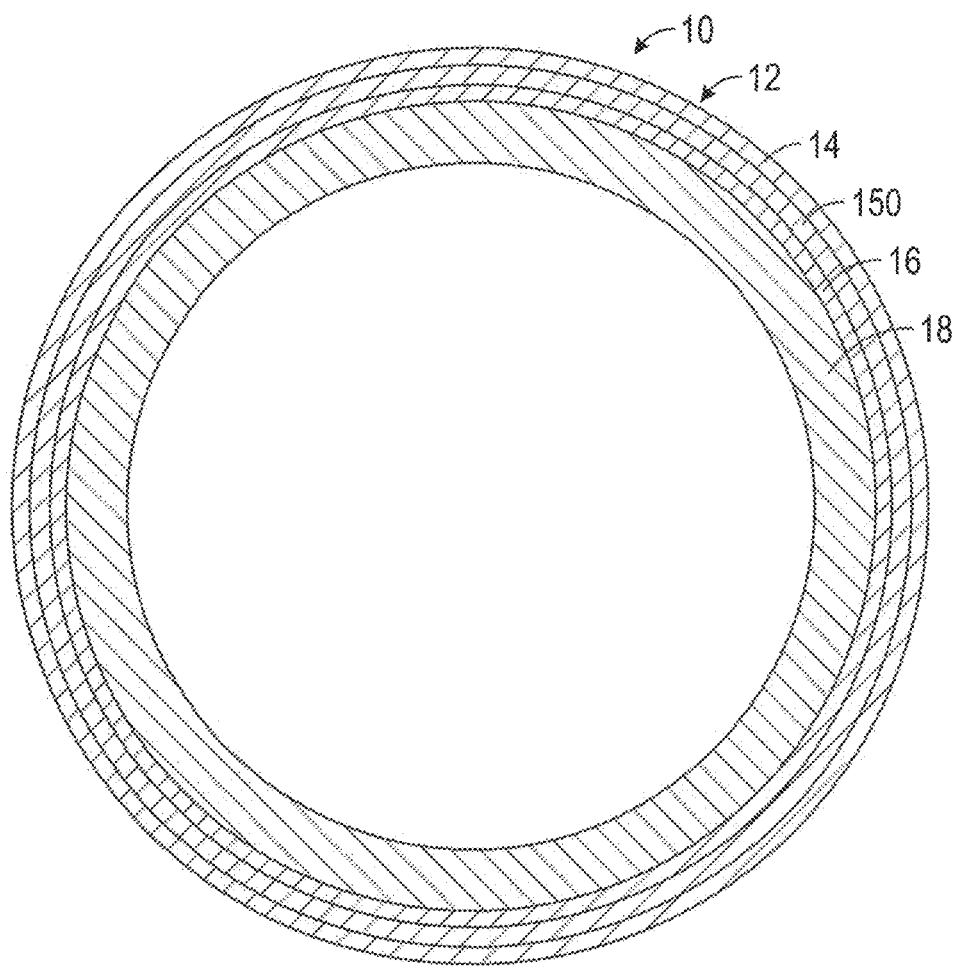
FIG. 19 is a cross-sectional view of a blow extruded multilayer film tube in accordance with a sixth embodiment of the invention, shown not to scale to better illustrate the layers of the film.

FIG. 19 shows a cross-sectional view of a tube 12 of film 10 in accordance with a sixth embodiment of the invention. The film 10 is identical to the fifth embodiment shown in FIG. 18, with the exception that the tie layer 82 has been omitted. In the embodiment shown in FIG. 19, the barrier layer 14 is preferably formed from a blend of high density polyethylene and low density polyethylene. This composition of the barrier layer 14 allows the barrier layer 14 to bond strongly with the tear resistance layer 150, without requiring a tie layer 82 therebetween. In the embodiment shown in FIG. 19, the tear resistance layer 150 is preferably formed from low density polyethylene, the alcohol barrier layer 16 is formed from cyclic olefin copolymer or a blend of cyclic olefin copolymer, and the sealing layer 18 is preferably formed from low density polyethylene.

The film 10 shown in FIG. 19 preferably does not include nylon 6, nylon 66, or PET. This allows for easier manufacturing, since no drying of the resin is required. It also allows the film 10 to be more easily recycled, due to the structure being formed from similar materials.

Optionally, in the embodiment shown in FIG. 19, the barrier layer 14 is formed from a blend of high density polyethylene, cyclic olefin copolymer, and low density polyethylene. This further increases the film's 10 resistance to the passage of alcohol therethrough. The barrier layer 14 may, for example, contain 10-30% high density polyethylene, 5-10% cyclic olefin copolymer, and 60-80% low density polyethylene. When the barrier layer 14 is formed from a blend of high density polyethylene, cyclic olefin copolymer, and low density polyethylene, the heat resistance of the barrier layer 14 increases. As such, to ensure effective heat sealing, the sealing layer 18 is preferably formed from low density polyethylene that is selected to have a low melting temperature.

Although six specific exemplary embodiments of the invention have been illustrated and described, the invention is not limited to these specific embodiments. For example, the film 10 may include additional layers beyond those described above to provide additional functionality. Nor is it necessary for the film 10 to be extruded as a tube 12. The film 10 could instead be extruded as a flat sheet, which is then folded and/or heat sealed to form a reservoir 76 or other structure. In some embodiments of the invention, the film 10 can be produced by methods other than blown film extrusion, such as by lamination or coating.

The barrier layer 14 is not limited to the specific composition and thickness described in the embodiments. Rather, the barrier layer 14 could have any suitable composition and thickness, and may comprise, for example, polyamide, copolyamide, polyester, polypropylene, nylon 6, nylon 66, PET, high density polyethylene, low density polyethylene, cyclic olefin copolymer, or blends thereof. In some embodiments, the barrier layer 14 has a thickness in the range of 1 to 100 microns, in the range of 1 to 10 microns, in the range of 10 to 20 microns, in the range of 5 to 10 microns, in the range of 2 to 10 microns, or about 10 microns. The barrier layer 14 is preferably selected to provide puncture resistance and/or to have a relatively high melting temperature relative to the sealing layer 18.

The alcohol barrier layer 16 is also not limited to the specific composition and thickness described in the embodiments. Rather, any suitable composition and thickness incorporating a sufficient quantity of cyclic olefin copolymer to substantially prevent the movement of alcohol through the film 10 could be used. For example, in some embodiments the alcohol barrier layer 16 is 100% cyclic olefin copolymer, while in others it is a cyclic olefin copolymer blend. In some embodiments the alcohol barrier layer 16 has a thickness in the range of 1 to 100 microns, in the range of 5 to 20 microns, in the range of 10 to 20 microns, in the range of 2 to 20 microns, or about 20 microns. Manufacturers of cyclic olefin copolymer include TOPAS Advanced Polymers (trademark: TOPAS), MITSUI CHEMICALS (trademark: APEL), JSR Corporation (trademark: ARTON), and ZEON Corporation (trademarks: ZEONEX and ZEONOR). In some embodiments, the alcohol barrier layer 16 is formed from TOPAS 8007. The alcohol barrier layer 16 is preferably selected to provide the desired rate of alcohol loss and the desired flexibility of the film 10.

The sealing layer 18 is also not limited to the specific composition and thickness described in the embodiments. Rather, any suitable composition and thickness could be used. The sealing layer 18 may comprise, for example, polyethylene, a copolymer of ethylene, polypropylene, a copolymer of propylene, a polyolefine elastomer, a polyolefine plastomer, ethylene-vinyl acetate, low-density polyethylene, linear low-density polyethylene, or blends thereof. In some embodiments, the sealing layer 18 has a thickness in the range of 1 to 200 microns, in the range of 60 to 100 microns, in the range of 20 to 100 microns, or about 80 microns. The sealing layer 18 is preferably selected to have a melting temperature that is significantly lower than the melting temperature of the barrier layer 14, and to have a sufficient thickness to provide a robust seal when heat sealed.

The tie layer 82 also need not have the specific composition and thickness described in the embodiments. For example, the tie layer 82 may comprise maleic anhydride grafted polyethylene, a copolymer of ethylene, maleic anhydride grafted linear low-density polyethylene, or blends thereof. In some embodiments, the tie layer 82 has a thickness in the range of 1 to 100 microns, in the range of 10 to 20 microns, in the range of 2 to 20 microns, about 10 microns, or about 20 microns. The tie layer 82 is preferably selected to provide a strong bond between the barrier layer 14 and the alcohol barrier layer 16, even when exposed to concentrated alcohol for an extended period of time.

The second alcohol barrier layer 84 also does not need to have the specific composition and thickness described in the embodiments. In some embodiments, the second alcohol barrier layer 84 has a thickness in the range of 1 to 50 microns, in the range of 1 to 10 microns, or about 5 microns. The second alcohol barrier layer 84 is preferably selected to help prevent alcohol from passing through the film 10. In some embodiments, the second alcohol barrier layer 84 is selected to reduce the amount of alcohol that diffuses through the film 10 to prevent or reduce the delamination and/or degradation of one or more layers of the film 10.

The overall thickness 86 of the film 10 is, in some embodiments, in the range of 80 to 150 microns, or in the range of 110 to 160 microns. In other embodiments, the thickness 86 of the film 10 may be larger or smaller. The thickness 86 may be adjusted to suit the intended purpose of the film 10 and/or its desired properties. Preferably, the thickness 86 is selected to maintain flexibility and reduce costs, while also providing the desired functionality, including the desired protection against the loss of alcohol through the film 10. In some embodiments, the film 10 is selected to have a smaller thickness 86 in order to improve the transparency of the film 10.

The layers may also have different melting temperatures than the exemplary melting temperatures described above. In embodiments of the invention that use heat sealing, the barrier layer 14 should have a higher melting temperature than the sealing layer 18, but the absolute values of the melting temperatures can vary depending on the composition and intended use of the film 10. For example, in some embodiments where the film 10 is exposed to very high temperatures during heat sealing, the barrier layer 14 preferably has a very high melting temperature. In other embodiments where the heat sealing is done at a lower temperature, it may be preferable for the barrier layer 14 to have a lower melting temperature, particularly if this allows for other desired properties such as increased flexibility, increased puncture resistance, and/or reduced costs. The alcohol barrier layer 16 also preferably has a higher melting temperature than the sealing layer 18.

The composition and thickness of the layers 14, 16, 18, 82, 84 may be selected based on the desired properties of the film 10. For example, the tie layer 82 is preferably selected to maintain strong adhesion between the layers 14, 16, 18, 82, 84, even when exposed to concentrated alcohol for an extended period of time. The thickness and composition of the alcohol barrier layer 16 can also be adjusted to alter the alcohol barrier properties, flexibility, and other characteristics of the film 10. In some preferred embodiments, the film 10 is configured so that less than 1% by weight of the alcohol is lost by evaporation from the pouch 20 after 3 years. In other embodiments, the film 10 may be configured to be more or less effective as an alcohol barrier. For example, in embodiments where the pouch 20 is intended to carry alcohol for a shorter time period, or at a lower concentration, the film 10 may be configured to permit alcohol to escape at a faster rate, such as by reducing the amount of cyclic olefin copolymer. A person skilled in the art could, through routine testing, adjust the composition of the film 10 so as to arrive at the desired properties, including the rate of alcohol loss through the film 10. In some embodiments, the pouch 20 is configured so that less than 5% by weight of the alcohol is lost by evaporation through the film 10 after 6 months at 40 degrees Celsius and at 70% relative humidity, for example under lab conditions intended to test a 3 year shelf-time. The pouch 20 may also be configured so that less than 5% by weight of the alcohol is lost by evaporation through the film 10 after 3 years at room temperature, 20 degrees Celsius, and at 45-60% relative humidity.

The layers 14, 16, 18, 82, 84 are preferably selected to remain intact and adhered to each other under a wide range of conditions. For example, the layers 14, 16, 18, 82, 84 are preferably selected to remain bonded when exposed to concentrated alcohol for an extended period of time, and under a wide range of temperatures, humidity levels, and physical stresses. Testing of some preferred embodiments has found that the pouch 20 is able to contain 70% alcohol for 4 weeks at 40 degrees Celsius and at 70% relative humidity without delamination or blistering. In other embodiments, the film 10 may be configured to remain bonded together for a different time period under different conditions, such as a different temperature, relative humidity, alcohol concentration, and duration. A person skilled in the art could, through routine testing, adjust the composition of the film 10 so as to arrive at the desired properties. For example, in some embodiments the composition of one or more of the layers 14, 16, 18, 82, 84 could be selected to reduce costs, though the resulting film 10 is more prone to delamination when exposed to concentrated alcohol for an extended period of time. This may be preferred, for example, in embodiments where the pouch 20 is used to contain alcohol at a low concentration or for a short period of time.

In some preferred embodiments, the film 10 remains transparent and does not experience discoloration when exposed to concentrated alcohol for an extended period of time. For example, testing of some preferred embodiments has found that the pouch 20 is able to contain 70% alcohol for 4 weeks at 40 degrees Celsius and at 70% relative humidity without discoloration. Other embodiments of the invention may be more or less prone to discoloration. A person skilled in the art could, through routine testing, adjust the composition of the film 10 so as to arrive at the desired properties, including the rate of discoloration under various conditions.

The layers 14, 16, 18, 82, 84 may also be selected to have more than one function. For example, in some embodiments of the invention the alcohol barrier layer 16 also serves as a tie layer 82, providing a strong bond between the barrier layer 14 and the sealing layer 18. The alcohol barrier layer 16 may, for example, be formed from a blend of cyclic olefin copolymer and another material with suitable adhesive properties, such as maleic anhydride grafted polyolefin, polyethylene, polypropylene, their copolymers, or blends thereof. In some embodiments, the alcohol barrier layer 16 is formed from a blend of cyclic olefin copolymer:maleic anhydride grafted polyolefin at a ratio of 80:20 or 70:30, or any other suitable ratio selected to provide the desired properties.

The pouch 20 is not limited to use as a reservoir 76 for a hand sanitizer dispenser 78 as has been described in the examples. Rather, the pouch 20 could be used to contain alcohol-based products for any suitable purpose, including other hygiene, pharmaceutical, or medical applications. For example, the pouch 20 could be used to store an alcohol-based product for sterilizing medical equipment. The pouch 20 is not limited to the specific construction, shape, and dimensions as depicted in the drawings. Rather, any construction suitable for the pouch's 20 intended purpose could be used. The film 10 is also not limited to being used to produce a pouch 20. Rather, the film 10 could be used for any suitable purpose, including for forming an alcohol evaporation barrier on other containers or products.

The pouch 20 may be used to contain any suitable product, including any liquid, gel, or emulsion containing a high or a low concentration of alcohol. The pouch 20 may contain, for example, products with an alcohol concentration of greater than 20%, greater than 40%, greater than 60%, greater than 70%, greater than 80%, or in the range of 20% to 95%, in the range of 40% to 100%, in the range of 70% to 100%, in the range of 70% to 95%, in the range of 80% to 90%, about 85%, or about 70%. In some embodiments, the pouch 20 contains up to 80% ethanol or isopropanol.

The spout 50 is not limited to the construction described and illustrated in the exemplary embodiments, but rather could have any suitable construction that permits the hand sanitizer 72, or other product, to be dispensed from the pouch 20. In some embodiments, the pouch 20 may have no spout 50 at all. For example, in some embodiments the hand sanitizer 72 could be accessed by puncturing or tearing the film 10, rather than via a spout 50. The spout 50 could also incorporate a valve structure, not shown, to control the movement of fluid between the inlet opening 58 and the outlet opening 74. Any suitable valve structure known to a person skilled in the art could be used.

Any suitable device and/or method for filling the pouch 20 with the hand sanitizer 72, or other product, could be used. Preferably, the device and/or method is selected to remove all air from the internal chamber 70 during the filling operation, so that there is no air within the internal chamber 70 during storage, during transportation, and/or during use of the pouch 20. Preferably, the pouch 20 is also configured to prevent air from entering the internal chamber 70. This may be achieved by placing a barrier over the outlet opening 74, such as a cap or a heat sealed section of the film 10; by providing a valve structure within the spout 50 that prevents air from entering the internal chamber; or by any other method known to a person skilled in the art.

In embodiments of the invention where the pouch 20 is used as a reservoir for a dispenser 78, either the pouch 20 or the dispenser 78 should include a dispensing mechanism for dispensing the hand sanitizer 72, or other product, from the pouch 20. The dispensing mechanism is preferably configured to prevent air from entering the pouch 20 during the dispensing operation. The dispensing mechanism may be configured to break a seal and/or displace a cap from the pouch 20 to access the hand sanitizer 72. The dispensing mechanism may, for example, incorporate a mechanism for displacing a seal or a capping member as described in European Patent No. 2644280 to Ophardt et al., granted Dec. 13, 2017, which is incorporated herein by reference. The dispensing mechanism is preferably configured to prevent evaporation of alcohol from the hand sanitizer 72 through the dispensing mechanism, such as by being formed from a thick, air tight plastic.

Any suitable dispensing mechanism as would be known to a person skilled in the art could be used. For example, the dispenser 78 may incorporate one or more pump mechanism as described in U.S. Pat. No. 8,816,860 to Ophardt et al., issued Aug. 26, 2014; U.S. Pat. No. 5,373,970 to Ophardt, issued Dec. 20, 1994; U.S. Pat. No. 8,976,031 to Ophardt, issued Mar. 10, 2015; U.S. Patent Application Publication No. 2016/0097386 to Ophardt et al., published Apr. 7, 2016; U.S. Patent Application Publication No. 2016/0256015 to Ophardt et al., published Sep. 8, 2016; U.S. Pat. No. 7,984,825 to Ophardt et al., issued Jul. 26, 2011; U.S. Pat. No. 8,684,236 to Ophardt, issued Apr. 1, 2014; U.S. Pat. No. 5,836,482 to Ophardt et al., issued Nov. 17, 1998; U.S. Pat. No. 8,113,388 to Ophardt et al., issued Feb. 14, 2012; and U.S. Patent Application Publication No. 2015/0190827 to Ophardt et al., published Jul. 9, 2015, each of which is incorporated herein by reference.

The invention includes all methods and uses of the film 10 and pouch 20, whether explicitly described herein or implicit in the described structures and features. For example, the invention includes a method of producing a pouch 20, including the steps of extruding a tube 12 of the multilayer film 10, cutting the tube 12 transversely at spaced intervals, and heat sealing the tube transversely to form the pouch 20. The invention also includes a method of storing alcohol in a pouch 20 comprising the multilayer film 10, including the steps of extruding a tube 12 of the multilayer film 10, cutting the tube 12 transversely at spaced intervals, heat sealing the tube transversely to form the pouch 20, and filling the pouch 20 with alcohol, such as ethanol.

The invention is not limited to the specific exemplary methods and uses that have been described, including the described order of steps. For example, in some embodiments of the invention the tube 12 could be heat sealed before being cut transversely. The pouch 20 could also be filled before it is heat sealed and/or cut in some embodiments. Nor is the invention limited to the specific manner of filling the pouch 20 that has been described. Rather, any suitable method of filling the pouch 20 that would occur to a person skilled in the art could be used. The invention is also not limited to the specific exemplary dispenser 78, spout 50, and heat sealing device 26 described and illustrated in the drawings. The invention also does not necessarily use heat to seal the pouch 20. In some embodiments, alternative sealing methods such as ultrasonic welding may be used instead. Testing has shown that, in some embodiments, ultrasonic welding may provide higher sealing efficiency and strength, in particular at the welding surface of the spout 50, which is a critical area during manufacturing to avoid leakage from the pouch 20.

In some preferred embodiments, the alcohol barrier layer 16 is positioned between two polyethylene layers, and is preferably extruded between the two polyethylene layers. For example, optionally the barrier layer 14 and the sealing layer 18 are formed from polyethylene, and the alcohol barrier layer 16 is positioned directly between the barrier layer 14 and the sealing layer 18 to form a structure as follows: barrier layer 14/alcohol barrier layer 16/sealing layer 18. Alternatively, one or more of the two polyethylene layers on either side of the alcohol barrier layer 16 could correspond to an additional layer other than the barrier layer 14 and/or the sealing layer 18. For example, the barrier layer 14 could be formed from polyamide, and the film 10 could have a structure as follows: polyamide barrier layer 14/tie layer 82/polyethylene layer/cyclic olefin copolymer alcohol barrier layer 16/polyethylene sealing layer 18. Alternatively, the film 10 could have the following structure: polyamide barrier layer 14/ethylene vinyl alcohol layer/tie layer 82/polyethylene layer/cyclic olefin copolymer alcohol barrier layer 16/polyethylene sealing layer 18. The film 10 could also have a structure as follows, for example: polyethylene barrier layer 14/tie layer 82/ethylene vinyl alcohol layer/tie layer 82/polyethylene layer/cyclic olefin copolymer alcohol barrier layer 16/polyethylene sealing layer 18.

In some preferred embodiments, the melting temperature of the barrier layer 14 is above 100 degrees Celsius, and the barrier layer 14 is formed from or includes polyethylene. The barrier layer 14 may, for example, include low density polyethylene, medium density polyethylene, high density polyethylene, polyolefin plastomers, polyolefin elastomers, or blends thereof. The film 10 may, for example, have a structure as follows: first polyethylene barrier layer 14/cyclic olefin copolymer alcohol barrier layer 16/second polyethylene sealing layer 18, where the first polyethylene barrier layer 14 is selected to have a higher melting temperature or glass temperature than the second polyethylene sealing layer 18.

In other preferred embodiments, the glass transition temperature of the barrier layer 14 is above 50 degrees Celsius, and the barrier layer 14 is formed from or includes cyclic olefin copolymer or blends thereof. For example, the film 10 could have a structure as follows: cyclic olefin copolymer barrier layer 14/cyclic olefin copolymer alcohol barrier layer 16/polyethylene sealing layer 18, where the cyclic olefin copolymer barrier layer 14 is selected to have a higher melting temperature or glass temperature than the polyethylene sealing layer 18. In other embodiments, the functions of the barrier layer 14 and the alcohol barrier layer 16 could be combined in one layer, with the film for example having a structure as follows: cyclic olefin copolymer/polyethylene, where the cyclic olefin copolymer has a higher melting temperature or glass temperature than the polyethylene.

In some embodiments, the sealing layer 18 is formed from or includes a copolymer of ethylene. The copolymer of ethylene may, for example, include ethylene-methyl acrylate, ethylene-ethyl acrylate, or ethylene butyl acrylate.

Although this disclosure has described and illustrated certain preferred embodiments of the invention, it is to be understood that the invention is not restricted to these particular embodiments. Rather, the invention includes all embodiments which are functional, chemical or mechanical equivalents of the specific embodiments and features that have been described and illustrated herein.

We claim:

1. A multilayer film comprising:
   a barrier layer;
   a sealing layer; and
   an alcohol barrier layer;
   wherein the alcohol barrier layer is positioned between the barrier layer and the sealing layer;
   wherein the alcohol barrier layer comprises a cyclic olefin copolymer; and
   wherein the alcohol barrier layer is positioned directly between two polyethylene layers.

2. The multilayer film according to claim 1, wherein the barrier layer has a higher melting temperature than the sealing layer;
   wherein the barrier layer comprises polyamide, copolyamide, nylon 6, nylon 66, polyethylene terephthalate, polyester, polypropylene, medium density polyethylene, a polyolefin plastomer, a polyolefin elastomer, high density polyethylene, low density polyethylene, cyclic olefin copolymer, or blends thereof; and
   wherein the barrier layer has a thickness of 5 to 20 microns.

3. The multilayer film according to claim 1, wherein the sealing layer comprises polyethylene, a copolymer of ethylene, polypropylene, a copolymer of propylene, a polyolefin elastomer, a polyolefin plastomer, ethylene-vinyl acetate, low density polyethylene, linear low density polyethylene, ethylene-methyl acrylate, ethylene-ethyl acrylate, ethylene butyl acrylate, or blends thereof; and
   wherein the sealing layer has a thickness of 1 to 200 microns.

4. The multilayer film according to claim 1, wherein the alcohol barrier layer substantially prevents alcohol from passing through the multilayer film.

5. The multilayer film according to claim 1, wherein the alcohol barrier layer has a thickness of 1 to 100 microns.

6. The multilayer film according to claim 1, further comprising a tie layer that is positioned between the barrier layer and the alcohol barrier layer;
   wherein the tie layer comprises maleic anhydride grafted polyethylene; a copolymer of ethylene; maleic anhydride grafted linear low-density polyethylene; or blends thereof; and
   wherein the tie layer has a thickness of 1 to 100 microns.

7. The multilayer film according to claim 1, wherein the multilayer film is formed as a tube, with the barrier layer forming an outer layer of the tube and the sealing layer forming an inner layer of the tube.

8. The multilayer film according to claim 1, wherein the multilayer film is produced by blown film extrusion.

9. The multilayer film according claim 1, wherein the multilayer film forms a pouch that contains alcohol.

10. The multilayer film according to claim 9, wherein the pouch is a fluid reservoir for a fluid dispenser and contains an alcohol-based hand cleaning fluid, the hand cleaning fluid comprising 70% to 100% alcohol.

11. The multilayer film according to claim 9, wherein the barrier layer forms an outer layer of the pouch and the sealing layer forms an inner layer of the pouch; and
   wherein the pouch is sealed by heating the multilayer film so that the sealing layer of a first portion of the pouch melts to form a seal with the sealing layer of a second portion of the pouch, without melting the barrier layer.

12. The multilayer film according to claim 1, wherein the multilayer film is transparent, flexible, and has a thickness of 110 to 160 microns.

13. The multilayer film according to claim 1, wherein the barrier layer comprises low density polyethylene, medium density polyethylene, high density polyethylene, a polyolefin plastomer, a polyolefin elastomer, cyclic olefin copolymer, or blends thereof; and
   wherein the barrier layer has a higher melting temperature than the sealing layer.

14. The multilayer film according to claim 1, wherein the barrier layer comprises nylon 6 or polyethylene terephthalate; and
   wherein the sealing layer comprises low density polyethylene.

15. A multilayer film comprising:
   a barrier layer;
   a sealing layer; and
   an alcohol barrier layer;
   wherein the alcohol barrier layer is positioned between the barrier layer and the sealing layer;
   wherein the alcohol barrier layer comprises a cyclic olefin copolymer;
   wherein the barrier layer comprises nylon 6 or polyethylene terephthalate;
   wherein the sealing layer comprises low density polyethylene;
   wherein the multilayer film further comprises a tear resistance layer that is positioned between the barrier layer and the alcohol barrier layer; and
   wherein the tear resistance layer comprises low density polyethylene.

16. A multilayer film comprising:
   a barrier layer;
   a sealing layer; and
   an alcohol barrier layer;
   wherein the alcohol barrier layer is positioned between the barrier layer and the sealing layer;
   wherein the alcohol barrier layer comprises a cyclic olefin copolymer;
   wherein the barrier layer has a higher melting temperature than the sealing layer;
   wherein the multilayer film further comprises a tear resistance layer that is positioned between the barrier layer and the alcohol barrier layer;
   wherein the tear resistance layer comprises low density polyethylene;
   wherein the barrier layer comprises a blend of high density polyethylene and low density polyethylene, or a blend of high density polyethylene, cyclic olefin copolymer, and low density polyethylene; and
   wherein the sealing layer comprises low density polyethylene.

17. The multilayer film according to claim 15, wherein the barrier layer has a higher melting temperature than the sealing layer;
   wherein the barrier layer has a thickness of 5 to 20 microns;
   wherein the sealing layer has a thickness of 1 to 200 microns;
   wherein the alcohol barrier layer substantially prevents alcohol from passing through the multilayer film;
   wherein the alcohol barrier layer has a thickness of 1 to 100 microns;
   wherein the multilayer film is produced by blown film extrusion; and
   wherein the multilayer film is transparent, flexible, and has a thickness of 110 to 160 microns.

18. The multilayer film according to claim 17, wherein the multilayer film forms a pouch that contains alcohol; and
   wherein the pouch is a fluid reservoir for a fluid dispenser and contains an alcohol-based hand cleaning fluid, the hand cleaning fluid comprising 70% to 100% alcohol.

19. The multilayer film according to claim 16, wherein the barrier layer has a thickness of 5 to 20 microns;
   wherein the sealing layer has a thickness of 1 to 200 microns;
   wherein the alcohol barrier layer substantially prevents alcohol from passing through the multilayer film;
   wherein the alcohol barrier layer has a thickness of 1 to 100 microns;
   wherein the multilayer film is produced by blown film extrusion; and
   wherein the multilayer film is transparent, flexible, and has a thickness of 110 to 160 microns.

20. The multilayer film according to claim 19, wherein the multilayer film forms a pouch that contains alcohol; and
   wherein the pouch is a fluid reservoir for a fluid dispenser and contains an alcohol-based hand cleaning fluid, the hand cleaning fluid comprising 70% to 100% alcohol.

* * * * *